US009652031B1

(12) United States Patent
Savastinuk et al.

(10) Patent No.: US 9,652,031 B1
(45) Date of Patent: May 16, 2017

(54) TRUST SHIFTING FOR USER POSITION DETECTION

(71) Applicant: Amazon Technologies, Inc., Reno, NV (US)

(72) Inventors: Paul Aksenti Savastinuk, Shoreline, WA (US); Jim Oommen Thomas, Seattle, WA (US); Geoffrey Scott Heller, Seattle, WA (US); Michael Lee Sandige, Sammamish, WA (US); Kah Kuen Fu, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 188 days.

(21) Appl. No.: 14/306,937

(22) Filed: Jun. 17, 2014

(51) Int. Cl.
G06F 3/01 (2006.01)

(52) U.S. Cl.
CPC .............. G06F 3/012 (2013.01); G06F 3/011 (2013.01)

(58) Field of Classification Search
None
See application file for complete search history.

(56) References Cited

U.S. PATENT DOCUMENTS

| | | | |
|---|---|---|---|
| 9,094,576 B1 * | 7/2015 | Karakotsios | H04N 7/157 |
| 9,317,175 B1 * | 4/2016 | Lockhart | G06F 3/04815 |
| 9,319,221 B1 * | 4/2016 | Awad | H04L 9/3231 |
| 9,354,709 B1 * | 5/2016 | Heller | G06F 3/017 |
| 2010/0125816 A1 * | 5/2010 | Bezos | G06F 1/1626 715/863 |
| 2010/0226487 A1 * | 9/2010 | Harder | G06F 1/325 379/202.01 |
| 2011/0167391 A1 * | 7/2011 | Momeyer | G06F 1/1684 715/863 |
| 2012/0162214 A1 * | 6/2012 | Chavez | G06F 3/012 345/419 |
| 2013/0016102 A1 * | 1/2013 | Look | G06T 15/20 345/426 |
| 2013/0021290 A1 * | 1/2013 | Zawacki | G06F 3/0416 345/174 |
| 2013/0091462 A1 * | 4/2013 | Gray | G06F 3/0346 715/810 |
| 2015/0055821 A1 * | 2/2015 | Fotland | G06K 9/3241 382/103 |
| 2015/0077323 A1 * | 3/2015 | Ramaswamy | G06F 3/012 345/156 |
| 2015/0082145 A1 * | 3/2015 | Ames | G06F 17/2247 715/234 |
| 2015/0082180 A1 * | 3/2015 | Ames | G06F 3/04815 715/738 |
| 2015/0082181 A1 * | 3/2015 | Ames | G06F 3/04815 715/738 |
| 2015/0085076 A1 * | 3/2015 | Lockhart | H04N 13/0468 348/46 |

(Continued)

Primary Examiner — Seokyun Moon
(74) Attorney, Agent, or Firm — Pierce Atwood LLP

(57) ABSTRACT

A device configured with a user interface (UI) that changes based on a position of a user determines the position of the user through multiple data sources including camera based head tracking and output from motion sensors such as a gyroscope. Each data source may output its own estimated head position. The device may apply a reliability weight to the head position determined by each data source. A composite head position is then determined from the weighted position. The composite position is then used to render the UI.

19 Claims, 16 Drawing Sheets

(56) References Cited

U.S. PATENT DOCUMENTS

| | | | |
|---|---|---|---|
| 2015/0213784 A1* | 7/2015 | Jafarzadeh | G09G 5/37 345/163 |
| 2015/0215526 A1* | 7/2015 | Jafarzadeh | G06F 3/012 348/218.1 |
| 2015/0215532 A1* | 7/2015 | Jafarzadeh | H04N 5/23238 348/36 |

* cited by examiner

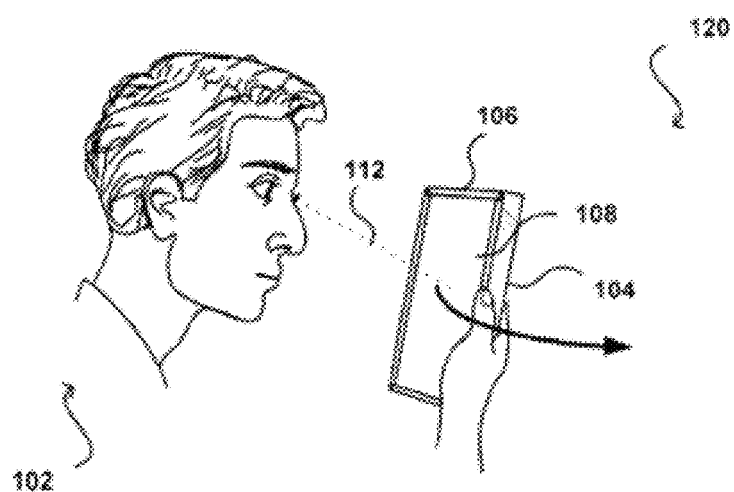
FIG. 1D
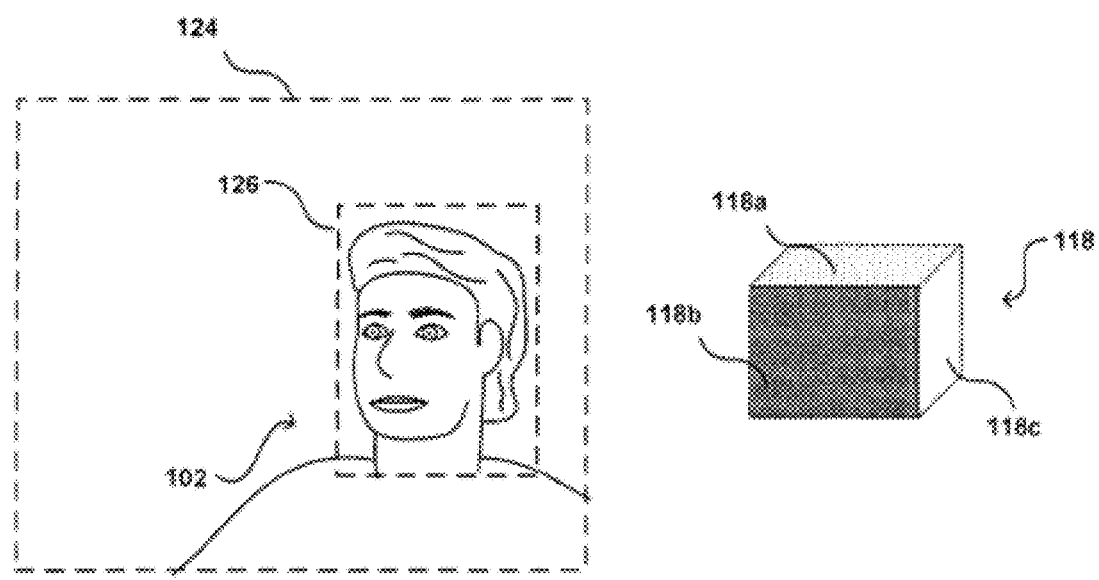
FIG. 1E
FIG. 1F

TRUST SHIFTING FOR USER POSITION DETECTION

BACKGROUND

Handheld electronic devices regular include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

FIGS. 1B-1I illustrate an example approach for detecting and tracking a user in relation to a device in accordance with an embodiment;

DETAILED DESCRIPTION

Figure 1A:
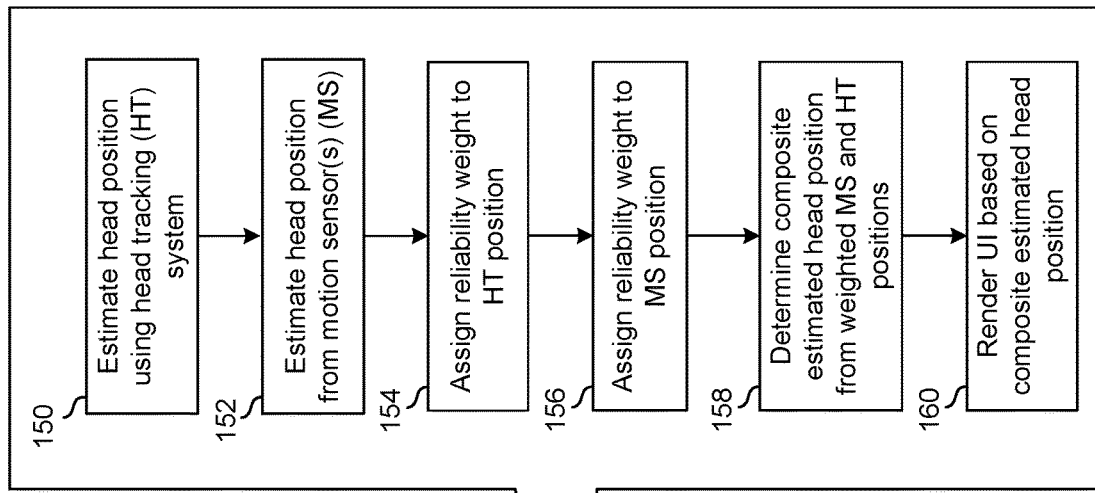
FIG. 1A illustrates an example approach for determining an estimated user position from multiple data sources in accordance with various embodiments.
Figure 1A:
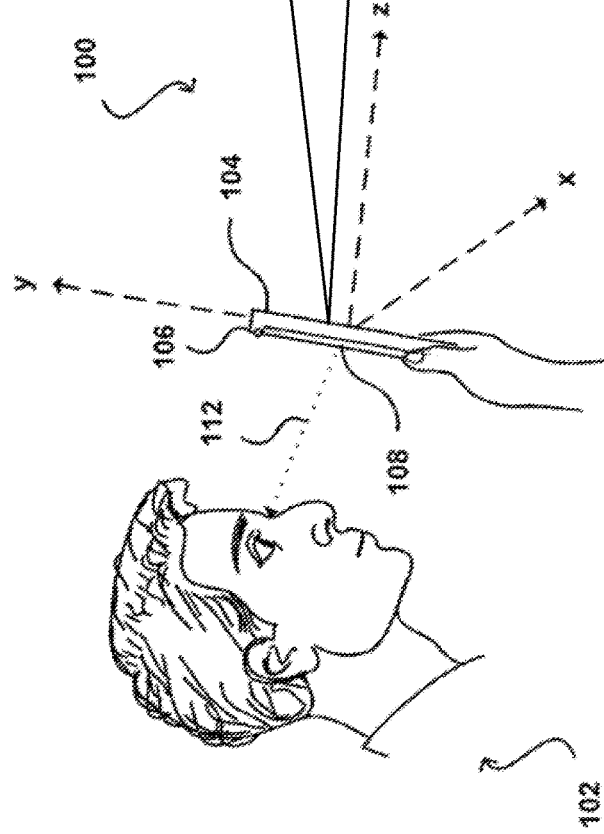

Certain computing devices may be configured with position based user interfaces. Such position based user interfaces may alter their appearance based on a user position relative to the device operating the user interface (UI). Such devices may determine relative user position using a number of techniques, include head detection. If a user's head is detected directly in front a device, graphical elements of the UI (such as icons, images, etc.) may display normally (as in a head on view). When a user's head is detected askew from the device, for example to the left or right by some amount, the UI may alter its display to show graphical elements or other content of the UI as if from an angle. In this manner the UI may create certain visual effects such as three dimensional (3D) effects, parallax, depth of UI graphical elements, or other effects.

Various embodiments involve determining a position of a user with respect to a device, such as by analyzing image data utilizing a user detection process, and tracking the user by combining the results of one or more tracking processes and/or other motion detection processes, such as determined by inertial sensors (e.g., accelerometer, gyroscope, inclinometer, and/or magnetometer). As there are not necessarily any dependencies between image-based tracking and inertial sensor-based motion detection, the two approaches can be complementary. The failure of one approach may not result in failure of the entire tracking system. For instance, image-based tracking can be computationally costly and may incur an undesirable amount of latency. Inertial sensor-based motion detection, on the other hand, has relatively lower latency but can be subject to drift over time. By combining image-based tracking and inertial sensor-based motion detection, the tracking system in the aggregate may not be subject to deficiencies of conventional approaches that use one particular approach alone.

In some embodiments, one detection and/or tracking process can be used as a primary or predominant approach and the other technique(s) may be used as the secondary detection and/or tracking approach(es) to the extent the primary or predominant approach fails to detect and/or track the user. For example, the secondary detection and/or tracking approach(es) may be executed only if the probability, confidence level, error rate, or other such metric corresponding to the estimated position of the user as determined by the primary detection and/or tracking approach is below a threshold value. As another example, one particular detection and/or tracking process may be highly accurate but computationally expensive and a second detection and/or tracking process may be less processor-intensive but less accurate from a "cold start" yet highly effective when the initial user position is known. The device can be configured to use the first detection and/or tracking process to detect the user and track the user using the second detection and/or tracking process thereafter.

In some embodiments, input data from inertial sensors or other input devices can be used to optimize an object tracking system. For example, device motion data captured by one or more inertial sensors can be used as a cue for where to begin detecting and/or tracking of the user in image data or to limit regions of the image data for detecting and/or tracking the user. As another example, a device may be equipped with an ambient light sensor that can capture the amount of ambient light in the environment in which the device is being used. Certain detection and/or tracking processes may be more sensitive to illumination conditions than others, and such processes may be selected (or not selected) for detecting and tracking a user and/or such processes can be weighted based on the determined amount of ambient light.

In some embodiments, multiple image-based user detection and/or tracking processes can be executed simultaneously, other motion determination techniques can be performed, and/or other sensor data analyzed for detecting and tracking a user. The data obtained by these independent processes can be aggregated for more robustly detecting and tracking a user. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration about three dimensions (e.g., x-, y-, and z-axis) while a three-axis gyroscope may be limited to measuring rotational acceleration about three dimensions (e.g., roll, pitch, and yaw). By implementing sensor fusion, the sensor data captured by the accelerometer and the gyroscope can be used to derive motion according to six dimensions or six degrees of freedom (6DOF). As yet another example, sensor fusion can be applied to aggregate motion and/or position of an object of interest evaluated using image analysis and motion and/or position derived from inertial sensor data.

In some embodiments, a probabilistic system can be created that models the physics of user motion, device motion, and image capturing by cameras of the device. The probabilistic system can define as inputs probability estimates of user position and/or orientation from the camera(s) of the device, probability estimates of device position and/or orientation from the inertial sensor(s) of the device, and/or other probability estimates. The probabilistic system can define the position and/or orientation of the user with respect to the computing device as the output based on a maximum likelihood estimation (MLE) approach. Sensor fusion techniques and probabilistic approaches can include Kalman filtering, extended Kalman filtering, unscented Kalman filtering, particle filtering, among others.

To determine when the system should trust head tracking data, when the system should trust motion sensor data, and when the system should trust them both (albeit perhaps to different degrees), a device may be configured to operate a reliability scheme that checks certain data points and assigns reliability scores to the outputs of the head tracking system and motion sensors. Those reliability scores may be used to weigh the outputs of the head tracking system and motion sensors. The weighed outputs may then be combined or used separately to determine a composite estimated head position that is some combination (for example, an average) of the weighted outputs of the head tracking system and/or motion sensors.

FIGS. 1A-1I illustrate an example approach for providing a user interface that is based on tracking of a head or face of a user in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

As shown in FIG. 1A, a device may determine an estimated head position using data from a head tracking (HT) system (150). The device may determine an estimated head position using data from one or more motion sensors (MS) (152). The device may assign a reliability weight to the head tracking estimated position (154) and the motion sensor(s) estimated position (156). The device may then determine a composite estimated head position from the weighted motion sensor and head tracking estimated positions (158). The device may then render a user interface (UI) based on the composite estimated head position (160).

In this example, a vector 112 is shown from a point at the center of the display screen 108 to a point on the head of the user 102, such as between the user's eyes. Vector 112 is a three-dimensional vector that can be initially determined, for example, using a facial detection process performed on the image(s) captured by the camera 106. In other embodiments, the vector can be determined using sensors or other input devices of a computing system, such as inertial sensors or proximity sensors. In at least some embodiments, vector 112 can be used by the device to smoothly animate content displayed on the screen 108 to compensate for a change in perspective of the user with respect to the screen. In other embodiments, multiple vectors can be determined between the computing device and various features of the user, such as the user's eyebrows, eyes, irises, pupils, or mouth. In still other embodiments, other representations or models can be used to define the relationship between the user and the computing device, such as primitive geometric shapes (e.g., rectangle, ellipse, triangles, cylinders, ellipsoids), contours (e.g., edges comprising the boundaries of the user's head or face), silhouettes (e.g., regions within the contours of the user's head or face), etc.

Figure 1C:
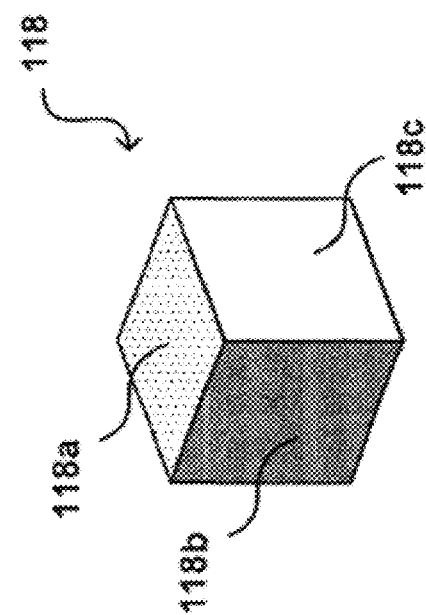
Figure 1B:
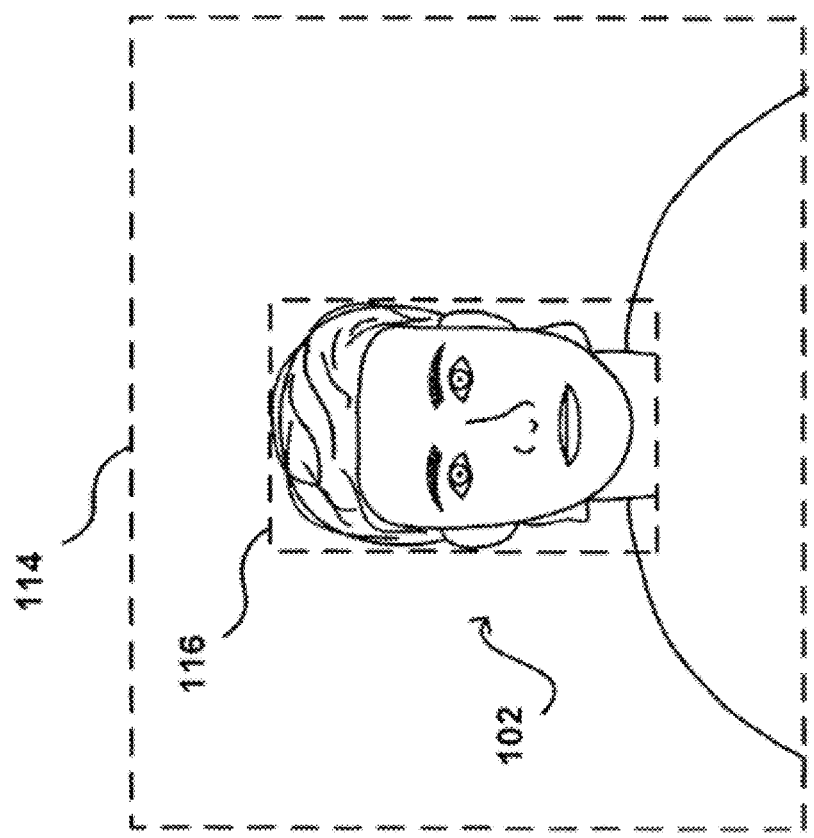
Figure 1G:
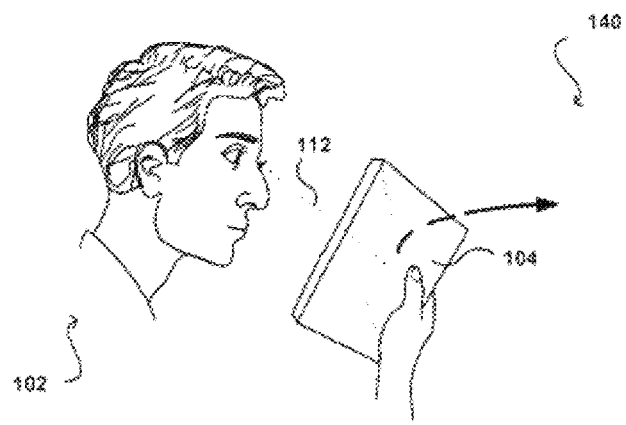
Figure 1H:
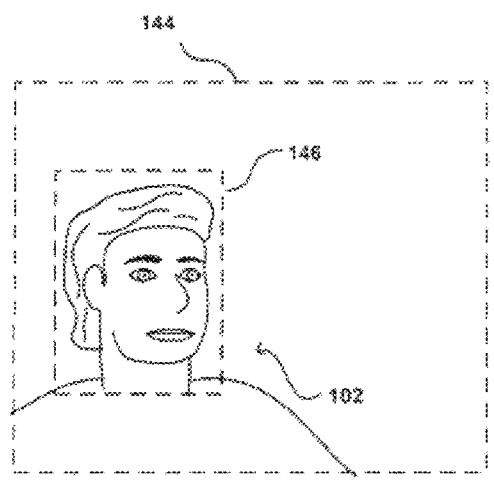
Figure 1I:
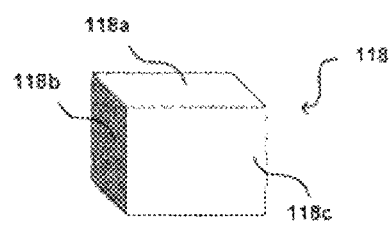

As illustrated in FIG. 1B, when the user 102 positions the computing device 104 directly in front of himself and gazes towards the display screen 108 straight on (i.e., the x-y plane of the device is parallel or substantially parallel to the user, where the lateral axis corresponds to the x-axis, the longitudinal axis corresponds to the y-axis, and the depth of the device or vertical axis corresponds to the z-axis), the image data captured by the camera 106 of the device can encompass the image 114. Although one image is shown to be captured in this instance, it will be appreciated that multiple images captured by a same camera at different times, multiple images captured by multiple cameras at a same time, or some combination thereof can be analyzed in various embodiments. Further, other embodiments may use other approaches, such as proximity sensors, to detect an object of interest with respect to a computing device. In this example, a user detection process is adapted for locating the head or face of a person. Here, the user detection process locates the head or face of the user 102 within the image 114 and provides as output the dimensions of a bounded box 116 indicating where the head or the face of the user is located in the image. In this example, the device is capable of rendering one or more three-dimensional graphical elements for display on the two-dimensional display screen 108 according to a first view or perspective of the user with respect to the display screen. The device relies on the pose of the head or face of the user with respect to the device and/or apparent motion of the user's head or face with respect to the device, as defined by vector 112, to render an appropriate perspective of a 3-D object as 2-D image data as illustrated in FIG. 1C, here, a cube 118 with a top surface 118a, a left front-facing surface 118b, and right front-facing surface 118c. The front-facing surfaces 118b and 118c appear to be equal in scale when the user gazes upon the display screen 108 straight on.

In FIG. 1D, an example situation 120 illustrates that the user 102 has tilted the computing device 104 to the right with respect to the perspective of the user, i.e., the user has rotated the device to his right about the longitudinal or y-axis, to obtain a second view or perspective of the 3-D object 118 depicted in FIG. 1F. As seen in FIG. 1E, the tilt or rotation of the device causes the camera 106 to capture a different view or perspective of the user within image 124, here, a three-quarters profile of the head or face of the user facing leftward. The position of the user's face may also be shifted towards a right region of the image because of the tilt or rotation of the device. In this example, the apparent motion of the face or head of the user (which is primarily due to the motion of the device) is tracked from the initial position detected in FIG. 1B to the new position depicted in FIG. 1E. For instance, the 3-D vector 112 between the point between the user's eyes and the center of the front face of the device is recalculated based on the new position and orientation of the user with respect to the computing device. Based on the apparent movement of the user's head or face, the 3-D object 118 is re-rendered for display on the display screen 108 to correspond to the new perspective of the user 102. For example, as the user tilts the device rightward, the device will render and/or animate the 3-D cube 118 such that the left front-facing surface 118b of the cube appears more prominently on the display screen and the right front-facing surface 118c appears at a more oblique angle.

In FIG. 1E, an example situation 140 illustrates that the user 102 has tilted the computing device 104 to the left with respect to the perspective of the user, i.e., the user has rotated the device to his left about the longitudinal or y-axis, to obtain a third view or perspective of the 3-D object 118. As seen in FIG. 1F, the tilt or rotation of the device causes the camera 106 to capture a three-quarters profile of the head or face of the user facing rightward, and the position of the user's face has also shifted towards a left region of the image. In this example, the apparent movement of the face or head of the user (which, again, is primarily due to the motion of the device) is tracked from a previous position to the new position depicted in FIG. 1F. The 3-D object 118 can be re-rendered for display on the display screen 108 based on the apparent motion of the user's head or face. For example, as the user tilts the device towards his left from the position depicted in FIG. 1B, the box will transition or be animated from the perspective seen in FIG. 1D to the perspective seen in FIG. 1B when the x-y plane of the device is parallel or substantially parallel to the user. As the user continues rotating the device towards his left, the 3-D cube 118 will transition or be animated from the perspective seen in FIG. 1B to the perspective seen in FIG. 1F wherein the right front-facing surface 118c of the cube 118 appears more prominently on the display screen and the left front-facing surface 118b appears at a more oblique angle. When the user tilts the device forward (i.e., rotating the device about the x-axis such that the top portion of front of the device is further away from the user and the bottom portion of the front of the device is closer to the user), details of a bottom surface (not shown) of 3-D cube 118 may be displayed and the top surface 118a may be hidden. Likewise, tiling the device backwards (i.e., rotating the device about the x-axis such that the top portion of the front of the device is closer to the user and the bottom portion of the front of the device is farther from the user), will cause the top surface 118a to be displayed more prominently. It will be appreciated that objects, such as the head or face of the user, can generally be tracked according to six degrees of freedom (e.g., motion along the x-, y-, and z-axes or forward/backward, up/down, and left/right, and rotation about the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the top surface 118a and left front-facing surface 118b of the cube may be displayed more prominently and the right front-facing surface 118c may be appear at a more oblique angle and the bottom surface may remain hidden. When the user tilts the device forward and towards his left (i.e., such that the bottom right corner of the device is the closest point of the device to the user), the bottom surface and right front-facing surface 118c can be displayed with more details, and the top surface 118a and left front-facing surface 118b may appear more obscured or hidden.

As mentioned, in some embodiments, tracking of the vector (or other representation of a user) can be based on analyzing the change in position and/or orientation of the user between a first image, such as image 114 of FIG. 1B, and a second image, such as image 124 of FIG. 1E. For example, one or more cameras of a device can be calibrated in order to recover 3-D quantitative measures about an object of interest represented in 2-D images captured by the camera(s), such as a distance of the object of interest from the device, the height of the object of interest, etc. Various approaches can be used for camera calibration, such as direct linear transformation (DLT); the algorithm set forth in Tsai, Roger, "A versatile camera calibration technique for high-accuracy 3D machine vision metrology using off-the-shelf TV cameras and lenses," Robotics and Automation, IEEE Journal of 3, no. 4 (1987): 323-344; and the algorithm set forth in Zhang, Zhengyou, "A flexible new technique for camera calibration," Pattern Analysis and Machine Intelligence, IEEE Transactions on 22, no. 11 (2000): 1330-1334, each of which are incorporated herein by reference.

In other embodiments, tracking of the vector can be based on input data captured using one or more sensors or other input devices of a computing system. For instance, a proximity sensor can be used to estimate an initial position of an object of interest with respect to the device. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated dimensions of the vector between the user and the computing device.

In still other embodiments, a combination of image-based tracking and tracking by inertial sensors can be used to track an object of interest. As mentioned, image-based tracking and inertial sensor-based tracking can be complementary. For example, inertial sensors may not be capable of differentiating between a change in inclination of a device from acceleration of the device. Further, there may be greater uncertainty associated with measurements by inertial sensors at slow motion than at high velocities. That is, inertial sensors may be more accurate at very high velocities and accelerations but less accurate at lower velocities and accelerations. Cameras and other imaging elements, on the other hand, can track features of an object of interest accurately at low velocities. However, image-based tracking may be less accurate at higher velocities due to motion blur and the effect of camera sampling rate. In addition, for high velocities and accelerations, cameras with higher frame rates may be bandwidth-limited by real time tracking requirements. It may also be difficult to distinguish motion due to translation and motion due to translation for certain objects of interest. Further, a near object of interest with low relative speed can appear the same as an object of interest further away with high relative speed.

In addition to the complementary characteristics of inertial sensors and cameras, differences between inertial sensor-based track and image-based tracking may also exist in relation to the processing requirements of these tracking approaches. Inertial sensor-based tracking may be less computationally expensive than image-based tracking because position information can be derived in constant time from data captured by inertial sensors while image-based track requires processing of at least a portion of a captured image. Image-based tracking, however, can be more reliable than inertial sensors in determining a position of a user with respect to a device in certain instances. For example, if a device remains stationary but a user tilts his head, inertial sensors will indicate no change in position of the user with respect to the device. Image-based tracking, on the other hand, may be more likely to detect the motion of the user with respect to the device. As another example, a user may be operating a device in a moving vehicle. Inertial sensors may indicate that the device is moving according to the direction of the vehicle even though the user may remain stationary with respect to the device. Image-based tracking can be more reliable in determining the position of the user with respect to the device in such a scenario.

In various embodiments, aggregation of image-based tracking and inertial sensor-based tracking can be loosely coupled or tightly coupled. A loosely coupled approach can comprise independent imaging and inertial navigation systems, running at different rates, and exchanging information. Translational and angular velocity estimates from the inertial sensors can be used to predict device motion, and velocity estimates from image-based tracking can be used to bound integration errors in the inertial sensors. Prediction of device motion can make the feature correspondence process more robust and can reduce the search space, thus reducing processing and use of power. A tightly coupled approach combines raw data of the cameras and inertial sensors in a single, optimum filter, such as a Kalman filter or a particle filter, as discussed further elsewhere herein.

In certain situations, a user may remain stationary or a device will be moved such that movement of the user's face or head may be negligible relative to the motion of the device. In such situations, it may be preferable to use motion data detected by the inertial sensors of the device for tracking the position and orientation of the user after the user has initially been detected in image data. In some embodiments, a user's change in position can be determined primarily based on motion data detected by the device's inertial sensors. For example, in one embodiment, the motion data detected by the inertial sensors can be sampled at a rate of 100.0 ms to update the user's position with respect to the device, and image data can be sampled at a rate of every 5.0 s to ensure that the user's position as determined by the inertial sensors do not substantially drift from the user's actual position. An advantage of such an approach would be to reduce the amount of processing that may be required by image-based tracking and conserve the battery life of the computing device. In other cases, image-based tracking can be used as the predominant approach for tracking the position if the user with respect to the device, and motion detected by inertial sensors can be used as backup in the event image-based tracking fails. For instance, lighting may temporarily go out or the user may otherwise be temporarily occluded such that an image-based tracking process is unable to track the user. In such instances, motion data captured by inertial sensors can be used to extrapolate the position of the user until the tracking process is able to re-track the user or a user detection process is executed to reinitialize the user's position with respect to the device.

In various embodiments, input data from inertial sensors or other input devices can be used to improve a tracking system. In some embodiments, motion data captured by inertial sensors can be used to improve performance of image-based tracking. For example, the relative position and orientation of a computing device can be derived from the inertial sensor data when a user moves the computing device. Techniques for determining the position and orientation of a computing device from inertial sensor data is well known in the art and will not be discussed herein detail. The position and orientation obtained from the inertial sensors can be used to limit one or more regions of the image data to be analyzed by an image-based tracking process, which can optimize the image-based tracking process by circumscribing the image data needed to be searched by the image-based tracking process. Certain tracking processes track an object when a sufficiently good model of the object has been found, i.e., one with sufficiently small error. Computation time can be saved for such processes by initializing the tracking process to begin searching for the object at an expected position based on the inertial sensor data.

In some embodiments, an ambient light sensor can be used to improve performance a tracking system. For instance, certain image-based tracking processes may be more sensitive to changes in illumination than other tracking processes. When the amount of light determined by the ambient light sensor is determined to meet or exceed a threshold value, an illumination-sensitive tracking process can be selected as the primary tracking process and/or the illumination-sensitive tracking process can be weighted greater based on illumination conditions. Alternatively, when the amount of ambient light of the current environment is below a threshold value, illumination-sensitive tracking processes may be excluded as the primary tracking process or such processes can be weighted less.

Figure 2A:
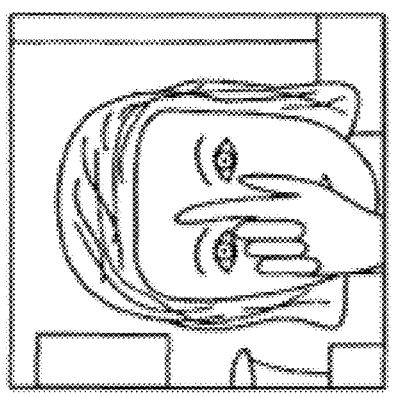
FIGS. 2A-2C illustrate stereoscopic image data that can be captured in accordance with various embodiments.
Figure 2B:
Figure 2C:
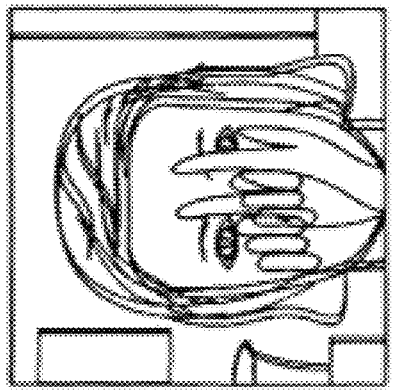

In some embodiments, a proximity sensor, depth sensor, distance sensor, structured lighting transceiver, and the like can be used to improve the robustness of a tracking system. For example, certain tracking processes capable of tracking an object in three-dimensional space can be more accurate with the distance or depth information provided by the proximity sensor, depth sensor, distance sensor, or structured lighting transceiver. In other embodiments, three-dimensional or stereoscopic image information can be captured using multiple cameras to provide three-dimensional point data, or disparity information that can be used to determine motion in three dimensions. FIGS. 2A and 2B illustrate images 200 and 220 that could be captured using a pair of cameras (e.g., stereoscopic cameras) embedded in a computing device. In various embodiments, the pair of cameras may capture the images simultaneously or substantially simultaneously and therefore would include at least some matching points of interest in their respective images. For example, the user's finger, nose, eyes, eyebrows, lips, or other features may be detected or tracked by the computing device in both images by using the various techniques discussed elsewhere herein. FIG. 2C illustrates an example combination image 240 showing the relative position of various objects in the captured images 200 and 220 if those images were "overlaid" or "superimposed" the amount of disparity, or lateral offset, between objects in the images. Objects closer to the device, such as the finger, have relatively large amounts of disparity. Objects farther away from the device, such as a painting on the wall, have relatively small amounts of disparity. Objects between these two areas will have intermediate amounts of disparity based upon the relative distance of those objects from the cameras.

Figure 3:
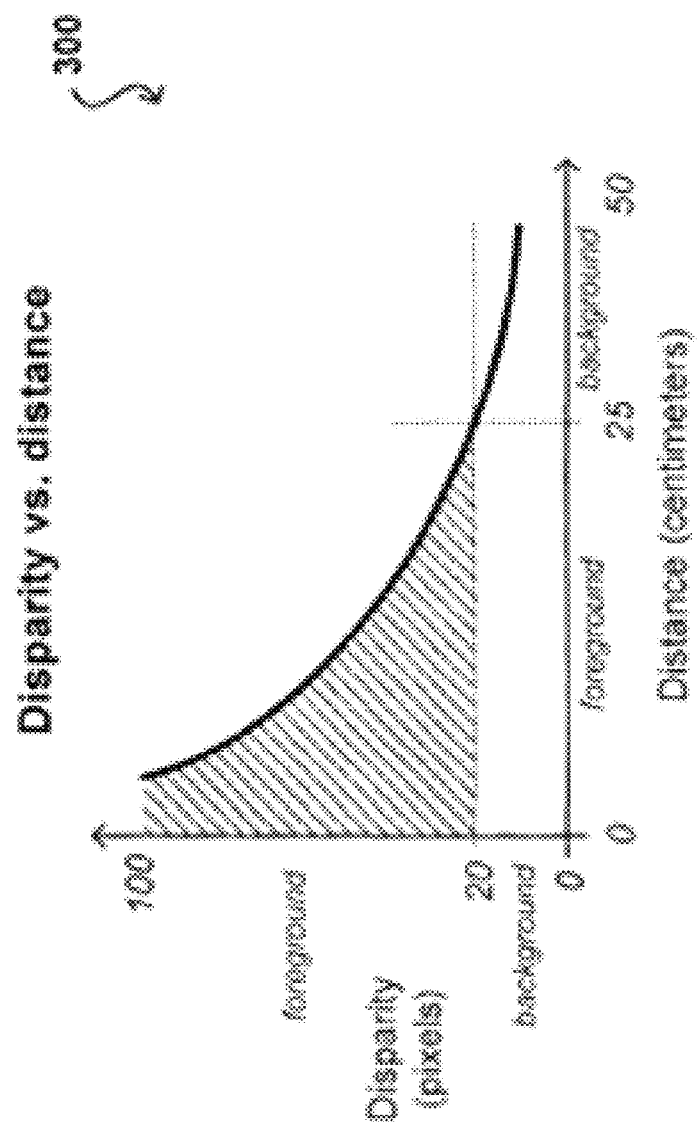
FIG. 3 illustrates an example plot showing a relationship of disparity with distance for an example stereoscopic imaging process that can be used in accordance with various embodiments.

FIG. 3 illustrates an example plot 300 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 300 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{f \times B}{d}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein.

In various embodiments, a user detection process is used to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data. Such an approach is discussed in Huang, Gary B. et al. "Learning hierarchical representations for face verification with convolutional deep belief networks." In Computer Vision and Pattern Recognition (CVPR), 2012 IEEE Conference on, pp. 2518-2525. IEEE, 2012, which is incorporated herein by reference.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image}|\text{object})}{P(\text{image}|\text{non}-\text{object})} > \frac{P(\text{non}-\text{object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. The Viola-Jones detector is discussed in Viola, Paul et al. "Rapid object detection using a boosted cascade of simple features." In Computer Vision and Pattern Recognition, 2001. CVPR 2001. Proceedings of the 2001 IEEE Computer Society Conference on, vol. 1, pp. 1-511. IEEE, 2001, which is incorporated herein by reference.

Surveys of various approaches of user detection are discussed in Yang, Ming-Hsuan et al., "Detecting faces in images: A survey." Pattern Analysis and Machine Intelligence, IEEE Transactions on 24, no. 1 (2002): 34-58 and Hjelmås, Erik et al. "Face detection: A Survey." Computer Vision and Image Understanding 83, no. 3 (2001): 236-274, which are each incorporated herein by reference.

Figure 4A:
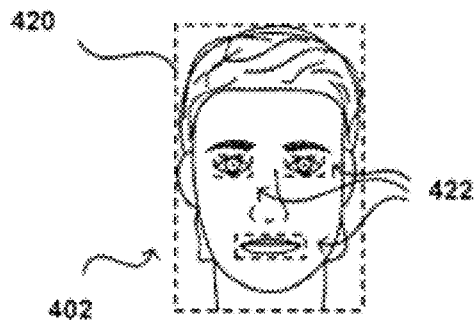
FIGS. 4A-4F illustrate examples of tracking a user in accordance various embodiments.

After at least a portion of a user has been detected in image data captured by a computing device, approaches in accordance with various embodiments track the detected portion of the user. FIGS. 4A-F illustrate certain approaches that can be utilized for detecting and tracking a user in accordance with various embodiments. FIG. 4A illustrates an example wherein the approximate position and orientation of the head of a user 402 has been determined and a virtual "box" 420 is placed around the user's head using one or more of the various user detection processes discussed herein. A similar or different approach can also be used to determine an approximate location and area 422 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth.

Figure 4B:

Various other approaches can also be used to track the user. For example, FIG. 4B illustrates an example wherein various features on a user's face are identified and assigned a point 424 in the image. The system thus can detect various aspects of user facial features and can determine changes such as movement or change in shape or expression. Such an approach can provide advantages over the general approach of FIG. 4A in certain situations, as various points along a facial feature can be determined, such as the end points and at least one center point of a user's mouth. Accordingly, expressions such as a smile or frown can be captured even though the overall position of the user's mouth or face did not move.

Figure 4C:
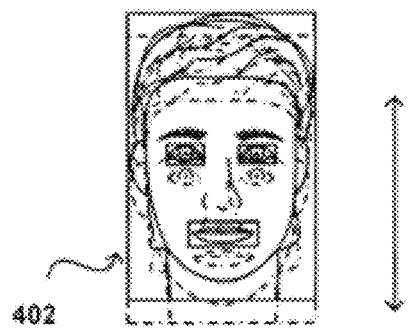
Figure 4D:
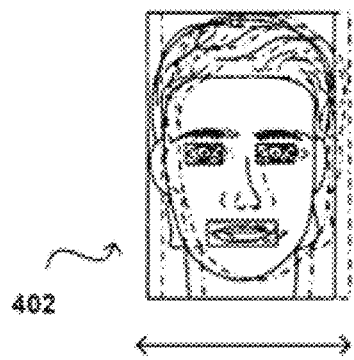
Figure 4E:
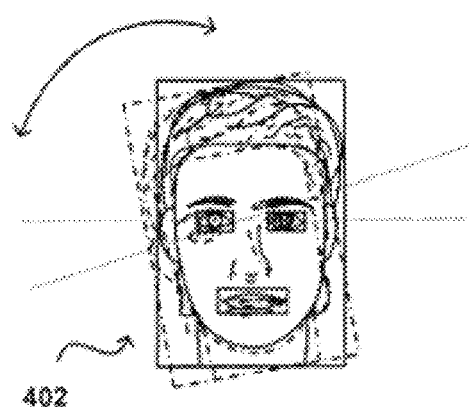

Once the facial features of a user are detected, relative motion or changes in facial expression can be tracked and utilized as input in accordance with various embodiments. For example, FIG. 4C illustrates an example where the user's head 402 is moving up and down with respect to the viewable area of the imaging element. As discussed, this could be the result of the user shaking his or her head, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 4E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 4F:
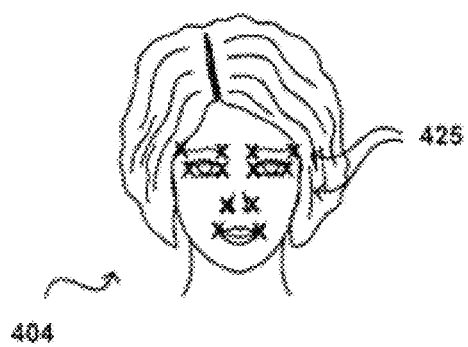

FIG. 4F illustrates another advantage of using an approach such as that described with respect to FIG. 4B to determine the position of various features on a user's face. In this example, it can be seen that the features of a head of a second user 403 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Figure 5A:
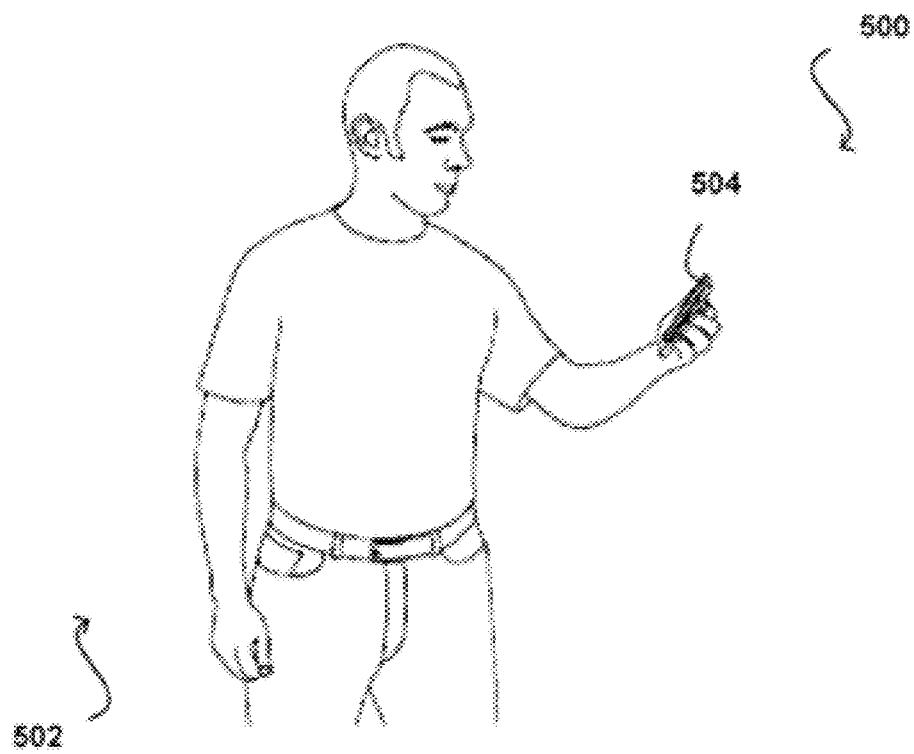
FIGS. 5A-5B illustrate example approaches for tracking a user in accordance with an embodiment.
Figure 5B:
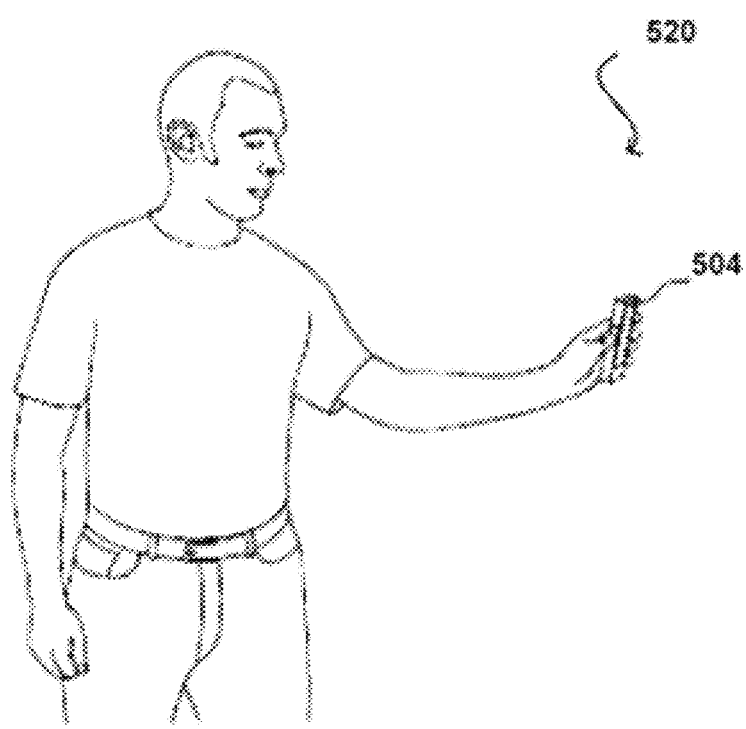

FIGS. 5A and 5B illustrate an example approach of using the motion of the computing device to supplement user detection and tracking in various embodiments. In FIG. 5A, the user 502 is holding a computing device 504, which in this example is shown to be a smartphone 504. The computing device may include one or more front-facing cameras that may capture images of the user's head, face, or other features and this image data may be analyzed for detecting and tracking a user as previously described. Because user detection and/or tracking typically can utilize a significant amount of resources, it may be useful for the computing device to leverage information about the motion of the device to enhance and supplement the user detection and/or tracking process. For example, it may be useful for the device to immediately detect (e.g., based on inertial sensor data) when the user has rotated or moved the device in such a way that the user would no longer be within the field of view of the front-facing camera(s). As shown in FIG. 5B, if the user turns the device around, the front-facing camera(s) would be facing away from the user and may have completely different objects within the field of view of the front-facing camera(s). One response to such detection may be for the computing device 504 to discontinue or suspend the user detection and/or tracking process rather than continue attempting to track the user. This may enable a more responsive user detection and/or tracking process.

Another example may be for the computing device to utilize the device motion information to continue the user detection and/or tracking process rather than discontinuing the process when the device is no longer detecting the user for short periods of time. For example, if the lighting conditions around the device are changing (e.g., when the user is on a moving train or bus), image data that can be analyzed may be captured when there is sufficient lighting and image data that cannot be analyzed may be captured when there is not enough lighting. Under such conditions, the device may analyze the motion information gathered by the sensors (e.g., accelerometer, gyroscope, light sensors, GPS receiver, etc.) and may determine that the computing device is likely located in a moving vehicle. Based on this determination, the computing device may elect to continue the user detection and/or tracking process uninterrupted (i.e., rather than repeatedly stopping and starting the process) based on the assumption that the user's face will soon once again become trackable due to the changing of the lighting conditions.

In some embodiments, user detection and tracking can be compensated, supplemented, or enhanced by motion estimation techniques that are based upon optical flow, such as block matching, differential methods, or phase correlation. Block matching is a correlation technique that searches for the best match between an image block of a current frame and a specified area of a previous frame. Differential techniques compute motion from spatial and temporal derivatives of image features such as intensities or filtered versions of the image. Differential methods include local methods and global methods. In various embodiments, local approaches based on the Lucas-Kanade optical flow algorithm can be used to determine inter-frame motion of an input video. The algorithm is set forth in Lucas, Bruce D. et al. "An iterative image registration technique with an application to stereo vision." In Proceedings of the 7th international joint conference on Artificial intelligence. 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to determine inter-frame motion of an input video. The Horn-Schunk algorithm is set forth in Horn, Berthold K P et al. "Determining optical flow." Artificial intelligence 17, no. 1 (1981): 185-203, which is incorporated herein by reference. Horn-Schunk uses a global regularization calculation as an additional constraint.

In some embodiments, phase correlation is used to determine inter-frame motion of an input video. Phase correlation is a frequency domain technique based on the shift property of the Fourier transform for measuring motion. To determine inter-frame motion using phase correlation, the cross power spectrum (CPS) of two frames is determined. If one frame is a shifted replica of the other, i.e., f2(x,y)=f1(x+x0, y+y0) then the phase of the cross power spectrum of the two frames f1 and f2 can be defined as:

$$CPS(f_1, f_2) = \frac{F_1(\xi, \eta) \cdot F_2^*(\xi, \eta)}{|F_1(\xi, \eta) \cdot F_2^*(\xi, \eta)|} = e^{j2\pi(\xi x_0 + \eta y_0)}$$

where F is the Fourier transform of the frame f and F* is the complex conjugate. The inverse Fourier transform of the cross power spectrum is an impulse whose coordinates are located at (x0, y0), the required shift.

In various embodiments, a position and/or orientation of a user can be determined more robustly by combining results of an image-based user detection and/or tracking process with additional data, such as position estimates from one or more other image-based user detection and/or tracking processes or motion estimates from inertial sensors and/or other motion detection processes (e.g., optical flow). In at least some embodiments, a probabilistic system can be defined that models the physics of user motion, device motion, and imaging capturing by cameras of the device. The system can receive as inputs position/orientation estimates from one or more image-based detection and/or tracking processes, device motion estimates from inertial sensors or optical flow techniques, other input data, and confidence levels associated with each of these inputs. The system can be modeled to output the position and/or orientation of the user using a maximum likelihood estimation (MLE) approach. Likelihood is closely related to the more familiar concept of probability. For example, the probability p of an event x, dependent upon model parameters θ, is defined as:

$$p(x|\theta).$$

The likelihood function l for θ, on the other hand, is defined as:

$$l(\theta|x) = p(x|\theta)$$

That is, the likelihood l characterizes the parameters θ of the model given the observed data x. Maximum likelihood estimation aims to find the parameter(s) θ that make the observed data x most likely. MLE approaches can include Kalman filtering or variations thereof (e.g., extended Kalman filter, unscented Kalman filter), particle filtering, among others.

In Kalman filtering, the state of a linear system can be estimated based on a Gaussian distribution of the state. Kalman filtering comprises two steps—prediction and correction. The prediction step uses the state model to predict the new state of the parameters of the model:

$$\vec{X}^t = \vec{D}X^{t-1} + W,$$

$$\sum{}^t = \vec{D}\sum{}^{t-1}\vec{D}^T + Q^t,$$

where $\vec{X}^t$ is the state prediction at time t, $\Sigma^t$ is the covariance prediction at time t, $\vec{D}$ is the state transition matrix correlating the relationship between the state parameters at time t and t−1, Q is covariance of the noise W. In the correction step, the current measurement Zt is used to update the object's state:

$$K^t = \sum{}^t \vec{M}^T \left[\vec{M}\sum{}^t \vec{M}^T + R^t\right]^{-1},$$

$$X^t = \vec{X}^t + K^t \underbrace{\left[R^t - \vec{M}\vec{X}^t\right]}_{v},$$

$$\sum{}^t = \sum{}^t - K^t \vec{M}\sum{}^t,$$

where v is referred to as the innovation, $\vec{M}$ is the measurement matrix, K is the Kalman gain (also referred to as the Riccati equation) used for propagation of the state model. When the system is nonlinear, a Taylor series expansion can be used to extend the Kalman filter.

When using a Kalman filter for tracking a user, the state of the Kalman filter may represent, for example, one or more of a position of the user relative to the device, a velocity or acceleration of the user with respect to the device, a position of the device, and motion of the device. The measurements used by the Kalman filter may include, for example, a location of the user as determined from camera images and measurements from inertial or other sensors of the device. For each new set of measurements obtained by the device the Kalman filter may be updated to obtain a new estimate of the location of the user relative to the device.

In particle filtering, the state of the object is modeled as a sampling probability instead of as a Gaussian distribution. Particle filtering models the conditional state density P(Xt|Zt) at time t as a set of samples or particles $\{s_t^n: n=1, \ldots, N\}$ with sampling probability or weights $\pi_t^n$. The weights are used to characterize the importance of a particular sample or particle. A common sampling technique is importance sampling, which includes selection of N random samples $\hat{s}_t^n$ from $\vec{S}_{t-1}$ by generating a random number r between 0 and 1 and finding the smallest j such that $c_{t-1}^{j-1} > r$ and setting $\hat{s}_t^n = \hat{s}_{t-1}^j$. In the prediction step, for each selected $\hat{s}_t^n$, a new sample is generated by:

$$s_t^n = f(\hat{s}_t^n, \vec{W}_t^n),$$

where $\vec{W}_t^n$ is a zero mean Gaussian error and f is a non-negative function, i.e., f(s)=s. In the correction step, weights $\pi_t^n$ corresponding to the new samples $s_t^n$ are calculated using the measurements zt by:

$$\pi_t^n = p(z_t \mid x_t = s_t^n),$$

where p can be modeled as a Gaussian density. Using the new samples $\vec{S}_t$, the new position of the object can be estimated using:

$$\varepsilon_t = \sum_{n=1}^N \pi_t^n f(s_t^n, \vec{W}).$$

When using a particle filter for tracking a user, the states and measurements may be the same as when using a Kalman filter. For each new set of measurements obtained at the device the particle filter may be used, as described above, to obtain a new estimate of the location of the user relative to the device.

Figure 6A:
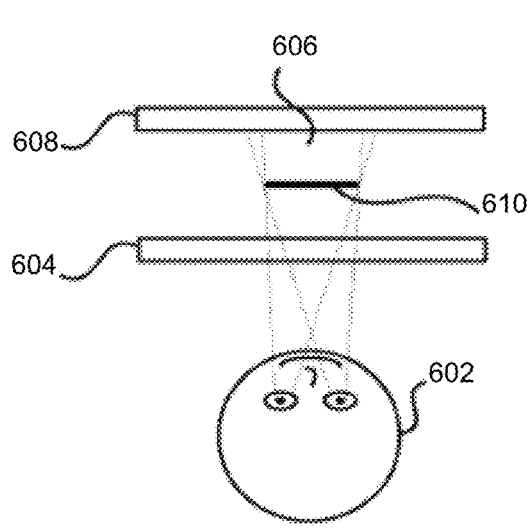
FIGS. 6A-6D illustrate example approaches to determining changes in the relative viewing angle for a user in accordance with various embodiments.
Figure 6B:
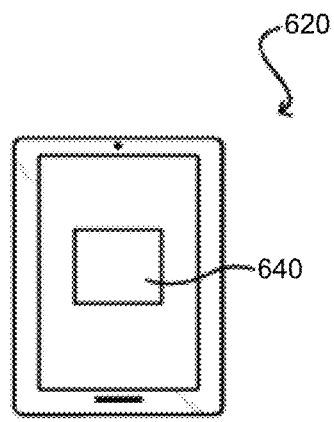
Figure 6C:
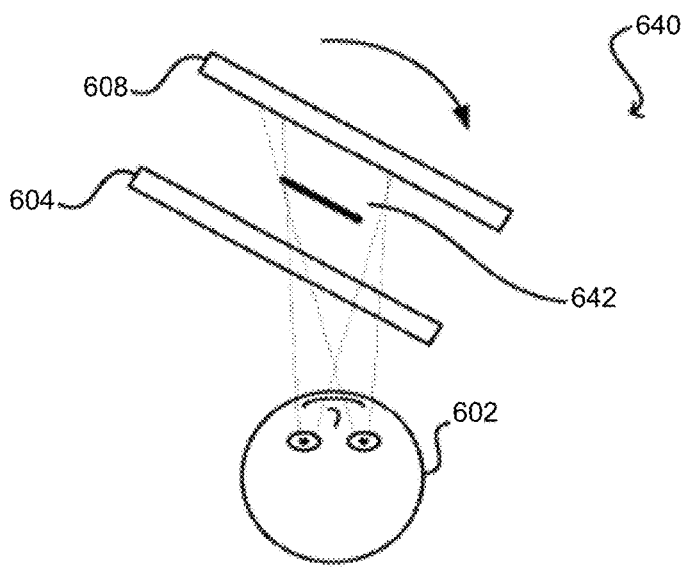
Figure 6D:
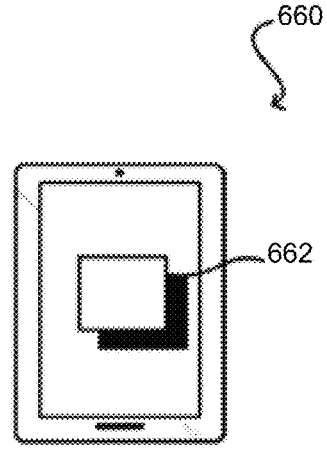

FIGS. 6A to 6D illustrate an example of how an interface plane or element at different depths can be used to generate viewing-angle appropriate images in accordance with at least some embodiments. In FIG. 6A, the example orientation 600 has a user 602 substantially in front of a display element 604 of a device. For simplicity of explanation, the interface plane or element here is represented in three dimensions, with a box 606 on a background 608. At the current viewing angle, the user is only able to see the top surface 610 of the interface plane or element 606, as illustrated in the display view 620 of FIG. 6B. In the orientation 640 of FIG. 6C, the device has been rotated (or the user has moved with respect to the device). To provide an appropriate user experience in at least some embodiments, the interface plane or element is effectively rotated with the device, such that the interface plane or element and background 608 would rotate accordingly. Based on the current viewing direction of the user 602, it can be seen in the display view 660 of FIG. 6D that the viewable portion 662 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 6C that any area occluded by the right side of the interface plane or element in FIG. 6A now can be seen, and that the area occluded by the left side of the box is interface plane or element greater in FIG. 6C.

Figure 7A:
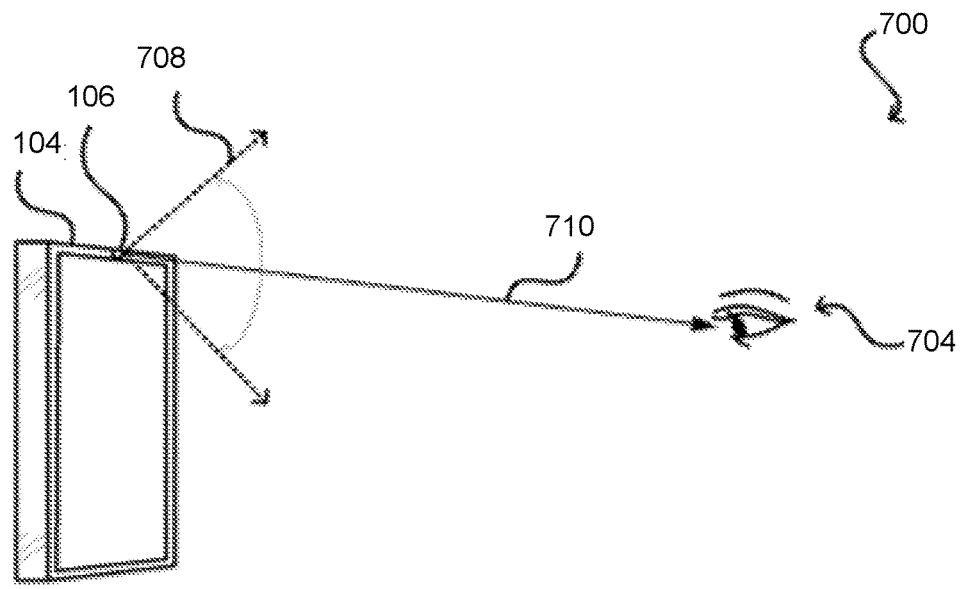
FIGS. 7A-7B illustrate an example approach to determining the relative position of a user that can be utilized in accordance with various embodiments.

In at least some embodiments, a computing device can utilize one or more cameras or other such sensors to determine the relative direction of the user. For example, FIG. 7A illustrates an example situation 700 wherein a computing device 104 is configured to utilize at least one camera element 106 to attempt to locate a feature of a user, such as the user's head or eyes, for purposes of point of view determination. In this example, the user's eyes 704 are located within the field of view 708 of a camera of the computing device 104. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 710 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 7B:
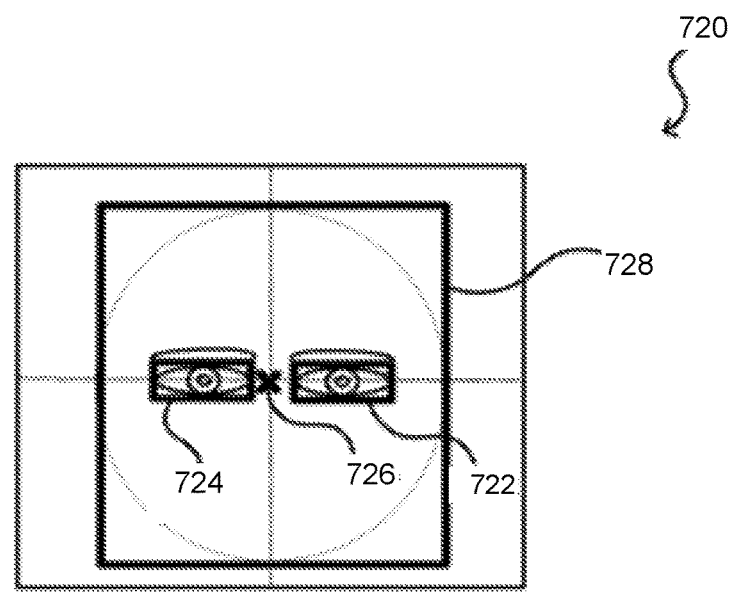

Further illustrating such an example approach, FIG. 7B illustrates an example image 720 that could be captured of the user's head and eyes using the camera 106 of FIG. 7A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 722, 724 for each eye, or at least an approximate location 728 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 726 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element (or combination thereof) of a computing device can be used to determine motion and/or orientation of the computing device, which can help adjust point of view determinations. The sensors may be any appropriate motion sensor(s) capable of providing information about rotations and/or translations of the device, as may include accelerometers, inertial sensors, electronic gyroscopes, electronic compasses, magnetometers, and the like. The device can be configured to monitor for a change in position and/or orientation of the device using these motion sensor(s).

Upon detecting a change in position and/or orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone. These various approaches—image-based head tracking of the user, motion/orientation sensor-based monitoring of the device, or a combined approach—are discussed in co-pending U.S. patent application Ser. No. 13/965,126, entitled, "Robust User Detection and Tracking," filed Aug. 12, 2013, which is incorporated herein by reference in its entirety.

Figure 8:
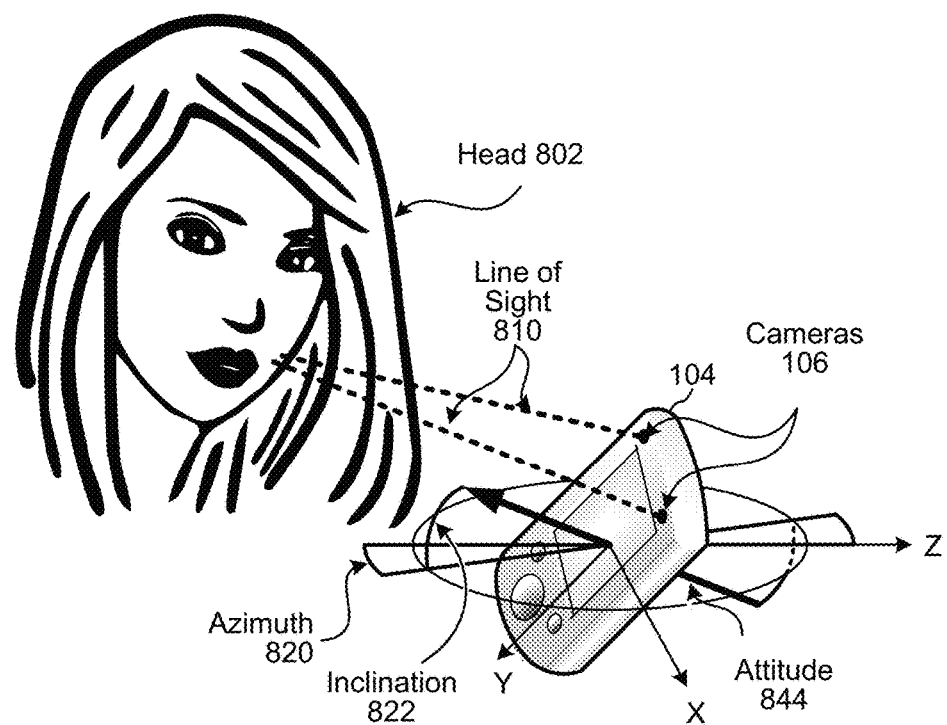
FIG. 8 illustrates using motion sensors with image processing to compute movement of a device in accordance with various embodiments.

FIG. 8 illustrates the use of the camera(s) 106 to determine orientation of the device 104 relative to a face/head 802 of a user while motion sensors may detect orientation/movement of the device 104. The position of the user/head may be determined based on the distance from the user to the device as well as based on the angle of the user/head relative to the device using camera(s) 106 and line of sight 810 using techniques described above. The device 104 may then render the UI based on the position of the user's face/head, for example using a projection matrix to render UI features as if the user's head is a camera projecting the UI. When a position of the user's head is established, certain changes to the head position may be detected using the motion sensors of the device, which provide output with lower latency that that of a head tracking system described above. The motion sensors of the device 104 may be used to track changes in device movement relative to an XYZ coordinate system (such as that illustrated in FIG. 8), relative to an angular position, such as an orientation measured in azimuth 820, inclination 822, or attitude, 824, or relative to some other measurement system. With a priori knowledge of the head position (as calculated by a camera based head tracking system) before a specific device movement, the device 104 may measure a change in orientation/position as measured by motion sensor(s) to compute an expected post-movement head position. The UI may then be rendered based on this expected post-movement head position.

Figure 9A:
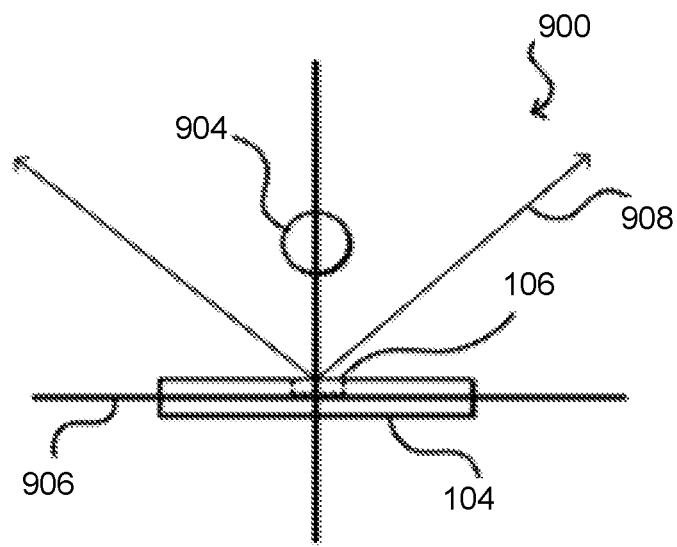
FIGS. 9A-9B illustrate an example approach to determining device motion that can be utilized in accordance with various embodiments.

For example, FIG. 9A illustrates a "top view" 900 of a computing device 104 operable to capture an image of an object 904 (e.g., a user's head) within an angular view 908 of a camera 106 of the computing device. In this example, the computing device 104 includes at least one orientation-determining element, such as an electronic compass or electronic gyroscope, that is able to determine a frame of reference 906 in two or three dimensions with respect to a first orientation of the device. In at least some embodiments, an electronic compass might be used to determine an axis of the frame of reference 906, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 906 or orientation can be determined at or near the time of capture of a first image by a camera 106 of the computing device 104. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 9B:
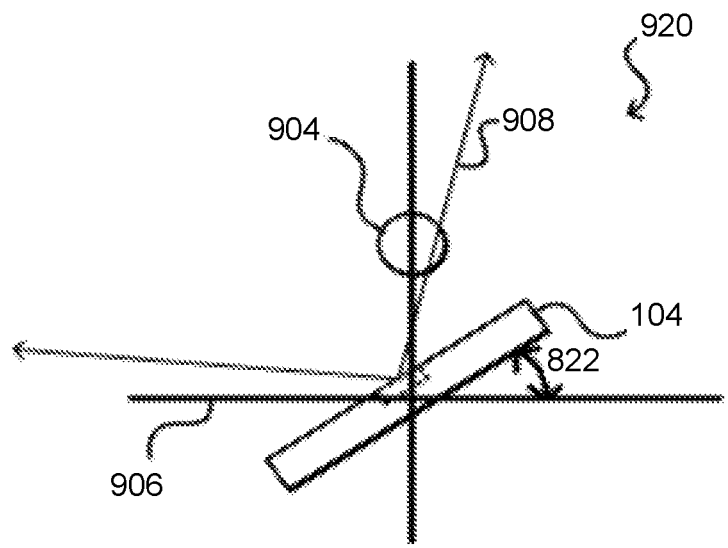

FIG. 9B illustrates a second top view 920 after a change in orientation of the computing device 104. The electronic gyroscope (or other such component or embedded sensor) can detect the change in orientation, in this example corresponding to a change in angle 912 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 912 about a single axis. As illustrated, this causes the object 904 to be moved to the right edge of the field of view 908 of the camera 106. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

A head tracking process such as those described above (which may be based on data from cameras, ultrasound sensors, or the like) may determine an initial estimated position of a user's head and may track the head as it moves relative to the device. In certain situations, data from motion sensors, such as a gyroscope, may determine a change from the initial estimated position to arrive at a second estimated position. Thus, head tracking techniques and motion sensor techniques may be combined to determine a position of a user relative to a device, and that position used to render a position based user interface (UI).

To improve performance of the position-based UI, it is desirable to know in what situations a system should rely on position information determined by a head tracking system, when the system should rely on position information determined by motion sensors, and when the system should combine the two. If data from one source is not reliable, using the position information from that source may result in poor performance. For example, head tracking data may be jittery (such as when a device is being held by a user while in motion, like riding a bus) that may result in an unstable UI rendering. Head tracking may also be limited by the field of view of the cameras or other sensors used to locate the head. Head tracking also typically suffers from greater latency than motion sensors due to the additional processing that is performed in order to isolate the head position based on input from cameras, etc. Head tracking data may suffer from latency ranging anywhere from 100-300 milliseconds, whereas latency for a motion sensor such as a gyroscope may be in the range of 5-15 milliseconds, depending on processor usage.

In addition to the latency difference, a head tracking system also generates different data from motion sensors. A head tracking system typically generates an estimated head position based on an XYZ (or other coordinate system). A motion sensor generates different data describing the motion of the device that is typically not linked to the coordinate system. For example, a gyroscope typically outputs an angular velocity relative to each axis of the device and an accelerometer outputs a linear motion along each axis of the device. The axes of the motion sensors may or may not line up with the coordinate system used by the head tracking system. Thus the two systems (head tracking and motion sensors) are not providing the same information. One (the motion sensor system) is outputting how the device is moving. The other (the head tracking system) is outputting where the head is relative to the device. Further, the system may have different data sampling frequencies. A head tracking system that relies on camera data may provide data at 30 frames-per-second whereas a motion sensor like a gyroscope may provide data at approximately 100 frames-per-second. So while a head tracking system may be more precise in terms of estimating a location of the head relative to the device, a motion sensor system may be more precise in terms of changes in position during smaller time increments.

With the different configurations of the head tracking and motion sensors, each method of tracking user motion relative to a device may have certain situations which make it preferable over the alternative method, particularly when the different methods result in different outcomes. For example, if a user is walking with a device and moves around a corner, the motion sensors would detect a turn of the device but the head tracking system would indicate that the user's head has not moved relative to the device. In this situation, it would be more desirable to render the position-based UI based on data from the head tracking system rather than the motion sensors. However if a user is standing still and wants to activate a UI function that relies on a quick flick of the device (for example a fast twist along a device axis), then the system may wish to rely more on the motion sensors than the head tracking system due to a number of concerns, including latency.

To address these issues, a trust/reliability scheme may be used to mediate between using head tracking data, motion sensor data, or both when estimating a user position for purposes such as rendering a position/motion based UI (or for other purposes which depend on estimated user position/motion relative to a device). A device or system may implement the reliability scheme to shift the weight given to head tracking data and the weight given to motion sensor data so the device more heavily considers the data that is determined to be reliable at any particular time. The shifting weights may occur quickly or be drawn out over time depending on the state of the user and/or the device. For example, a device may favor low latency motion sensor data if that motion sensor data is determined to be reliable. The reliability is determined based on a number of factors, including the type of motion detected and a current context of a device. For example, if the device is simply tilted by a stationary user, data from motion sensors may be trusted. But if the device is tilted in a car that's taking a right turn, data from a head tracking system may be trusted more. In cases where motion sensor becomes unreliable, head tracking data may be determined to be more reliable. The device may shift a reliability determination smoothly so that a user does not notice an abrupt transition in the rendering of the UI.

To determine how a device may implement a reliability scheme to control the UI in a manner that results in a desired performance, a variety of data points were studied during device operation. Those data points described the operation of the device across a multitude of operation samples. After extrapolating that data, a number of data points, referred to here as features, were determined to be useful data points to track when implementing a reliability scheme. The useful data points are then considered by the device during operation to classify the device status into one of a number of states. The state may then determine which position estimate system (either head tracking or motion sensors) should be trusted/determined to be reliable and how reliability score(s) between the systems should be adjusted.

Figure 10:
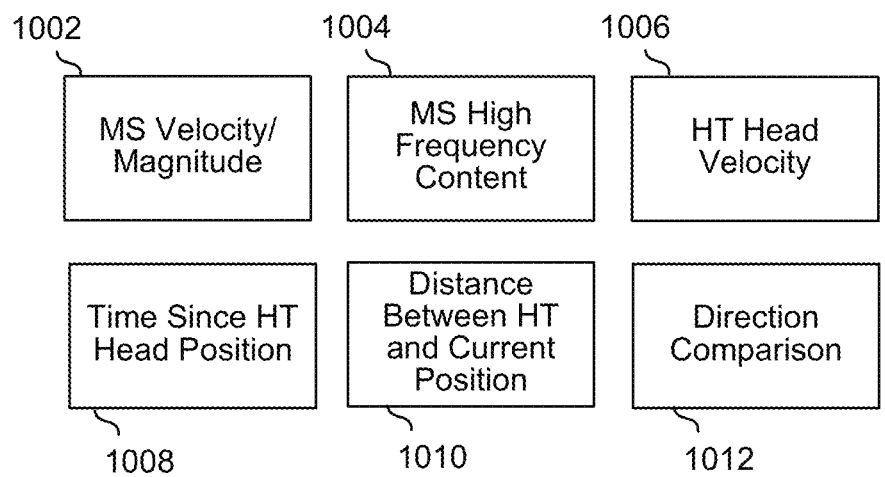
FIG. 10 illustrates example data features and states that may be used to estimate user position from multiple data sources in accordance with various embodiments
Figure 10:
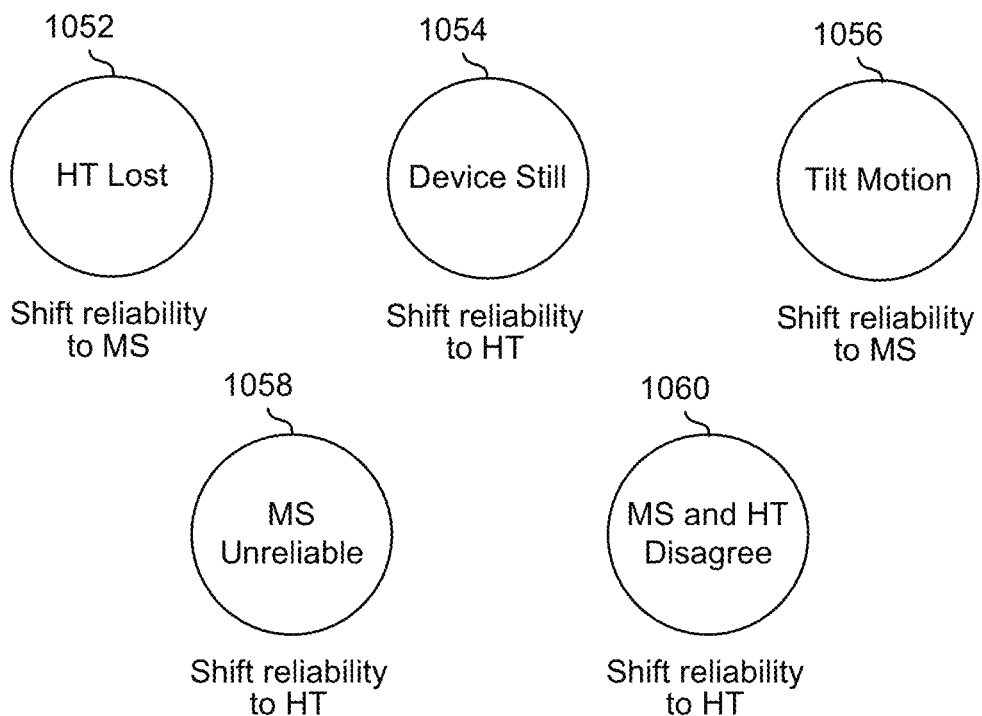

FIG. 10 illustrates a number of different features and states that may be considered by a device when assigning reliability to position estimation data from multiple sources. These features and states are examples only, and other features and/or states may also be considered, or certain features/states illustrated in FIG. 10 may not be considered. The following are features illustrated in FIG. 10 as data points that may be considered when determining what data sources to trust when estimating user position.

Feature 1002 is the value/magnitude of movement detected by one or more motion sensors (MS). This may be measured as a sine of a device velocity detected by a motion sensor, such as a gyroscope. Feature 1002 will be high when the motion sensor(s) detects a large movement by the device. The determination of what movements may be considered "large" may be configured by the system/device.

Feature 1004 indicates whether any high frequency movement is detected by the motion sensor(s). What determines whether movement is "high frequency" may also be configured, but may typically correspond with movement that is not the result of user activity. For example, movement at a frequency of above 100 Hz is unlikely to be caused by intentional user activity and may be the result of other influences (for example, vehicle movement, etc.). An indication of high frequency movement in feature 1004 may describe certain movements as not user generated, thus adding context to the movement and assisting the reliability scheme in determining how to weight the different inputs.

Feature 1006 is a measurement of head velocity as determined by the head tracking (HT) system. If a head is determined by the head tracking system to be moving rapidly, that may affect the weight given to head tracking data.

Feature 1008 is an indication of the time since a head position was determined by the head tracking system. As indicated above, because the head tracking system may not produce an estimated head position as frequently as the motion sensor(s) indicates a change of movement (for example, 30 times per second for the head tracking system and up to 100 times per second for a motion sensor), and because the head tracking system may lose track of the head during certain circumstances (for example, camera blockage, head moving out of range, etc.), it may be useful for the device to know how old a head position calculation is. Feature 1008 gives an indication of the age of the estimated head position. The weight given to this estimated head position may then be based on this age.

Feature 1010 indicates a distance between an estimated head position as determined by the head tracking system and a current estimated position as used by the device to render the UI. As noted below, these positions may not always be the same as the position used by the device to render the UI may be a fused composite of different positions estimated by the head tracking system and motion sensor(s). Feature 1010 will indicate if the difference between the current estimated position and a head position determined by the head tracking system exceeds a configurable threshold. The distance/difference may be based on the output from the head tracking system/cameras and the output of the motion sensor(s). For example, the distance may be determined by comparing the positions to each other and determining a vector describing the distance in three-dimensional space between the positions. Feature 1010 may include that vector. Thus the device may adjust one or more scores based on the vector (for example if the vector exceeds a threshold length and/or direction).

Feature 1012 indicates whether movement estimated by the head tracking systems differs in direction from a movement estimated by the motion sensor(s). This may occur with certain device movements and may indicate to the device to shift a reliability determination from one system to the other.

These features, and/or others, may be evaluated to determine a state of the device. Example states are shown in FIG. 10. State 1052 is entered when the head tracking system has lost track of the user's head. This may be determined, for example, based on the head tracking determining a low confidence score that a head is detected, by the age of the head tracking's data (as indicated by feature 1008) exceeding a threshold, or in other ways. If the head tracking system has lost track of the user's head, the reliability determination of the motion sensor(s) data may be increased, as in indicating the motion sensors have an increased reliability.

State 1054 is entered when the device is still, that is movement of the device as detected by the motion sensor(s) fall below a configurable threshold. When the device is still, the reliability determination of the head tracking data may be increased.

State 1056 is entered when a tilting motion is detected. A tilting motion is a rotation of the device along one of its axes (for example, rotating along the Y axis as illustrated in FIG. 8). This may indicate that the user intends to activate a UI feature that is activate by the tilting motion. If a tilting motion is detected, the reliability determination of the motion sensor(s) data may be increased. The reliability adjustment may depend on whether the speed/acceleration of the tilt exceeds a configurable threshold. If it does, and the tilt is determined to be a "fast" tilt (as in the speed/acceleration is above the threshold), then the reliability of the motion sensor(s) may be adjusted more than if the tilt is determined to be a "slow" tilt (as in the speed/acceleration is below the threshold). The speed/acceleration may be determined based on output from a head tracking system/cameras and/or based on output from motion sensor(s).

State 1058 is entered when a condition occurs (as indicated by the features) that the motion sensor(s) data may have become unreliable. Examples include experiencing a shaking in the device (for example as indicated by feature 1004), if movement of the device is detected (for example by the motion sensor(s)) but the user's position relative to the device has not changed (for example as detected by the head tracking system), or under certain other conditions. For example, if a user is walking with the device and rounds a corner, or if the user is in a revolving chair, the motion sensor(s) will detect motion, even though the user's head remains generally in the same position relative to the device. Thus, if the UI was rendered based on the motion sensor data, it would result in an incorrect rendering relative to the UI. Thus the motion sensor(s) may be considered unreliable in this situation. Another example may include if the device (and user) are being shaken, for example due to bumps while riding on a bus, airplane, etc. Such bumps will be recorded by the motion sensor(s) as movement, even though the user does not move relative to the device (and indeed may bump along with it.) In such situations (and/or others), the device may enter state 1058 and increase the reliability determination of the head tracking system.

State 1060 is entered when the data from the head tracking system and motion sensor(s) disagree as to the movement of the device relative to the user. For example, if a user moves the device in a fanning motion (i.e., moves the device along the x-axis alone), the motion sensor(s) may indicate that a head is moving left but the head tracking system may indicate a head is moving right. When the head tracking system and motion sensor(s) disagree beyond a certain threshold, the device may enter state 1060 and increase the reliability determination of the head tracking system.

A state determination, that is the determination to stay in a given state, or change states, may be performed each time movement of the device is detected. Such detection may be triggered by output from the motion sensor(s) as they have low latency and a relatively high sampling rate.

In addition to the above specified states, other factors may be considered when determining reliability score(s). If camera (or other visual sensor data used for the head tracking system) is determined to be unreliable, the reliability score may shift toward the motion sensor(s). For example, if the head tracking system has a low confidence score for the detected head, if a detected head at one moment looks very different from a head detected at a previous moment, or if camera images are very jittery, out of focus, high in noise, or of otherwise low quality, the head tracking data may be determined to be unreliable.

In another embodiment, if an estimated position as determined by the head tracking system differs from a composite estimated position (discussed below) by a certain threshold, the reliability score for the head tracking system may be increased. The increase in reliability score for the head tracking system may be greater for greater disparities between the head tracking estimated position and the composite estimated position. This approach may result in a rendering system that favors the motion sensor(s) in certain situations, but eventually converges on the estimated position determined by the head tracking system. The speed at which the composite position converges on the head tracking system's position depends on the speed and severity of the movement.

To shift trust between the head tracking system and motion sensor(s), a reliability score may be used. For purposes of illustration a single reliability score is discussed below, with that reliability score changing between a value of 0 indicating full trust in the motion sensor(s) and a value of 1 indicating full trust in the head tracking system. The reliability score may be adjust incrementally between 0 and 1 based on the states/features as discussed below. Other values and/or other orientations of the score may also be used. Further, although illustrated as a single score, multiple reliability scores may be used, for example the head tracking system may be associated with one score and the motion sensors may be associated with a different score. In other examples, each motion sensor may be associated with its own score (for example when data from an accelerometer has a different trust value than data from a gyroscope). Other examples of reliability/trust scores are also possible.

For the reliability score measured from 0 to 1, each movement event may alter the reliability score depending on the value of the above discussed features and the state of the device as discussed above. (Certain movement events may also not end up altering the reliability score, depending on the event.) For example, if a movement event results in a state where reliability should be shifted toward the head tracking system, the present reliability score may be increased incrementally. The amount of adjustment to the reliability score may be based on how fast reliability should be shifted. A fast shift of reliability may improve the likelihood that the UI renders correctly, but may also result in a jarring shift of the UI from the point of view of the user. It may be desirable in such situations, to gradually adjust the reliability score to smooth the overall effect to the UI. For example, the reliability score may be adjusted 0.1 in several steps rather than jumping straight to 1 or 0. In other situations, larger adjustments may be made to the reliability score to avoid UI rendering errors in the face of certain kinds of movement (for example, a high speed of movement of the device as indicated on motion sensor data received by the device).

The value of the reliability score may be used to adjust the estimated head positions determined by the head tracking system and/or motion sensor(s) to determine a composite estimated head position. The composite estimated head position may then be used as the head position for purposes of rendering the UI. For example, the estimated position of the head as determined by the head tracking system may be referred to as $P_{HT}$ and the position of head as determined by the motion sensor(s) may be referred to as $P_{MS}$. $P_{MS}$ may be based on a previous head position, and where the motion sensor(s) believe the head to be, using the movement of the device and the previous head position. For example, if the motion sensor is a gyroscope that produces a rotation matrix indicating angular position changes, a component such as motion recognition engine 1140 (discussed below in reference to FIG. 11) may determine a value for $P_{MS}$ based on the rotation matrix and a previous estimated position of the head used to render the UI.

Each of the positions $P_{HT}$ and $P_{MS}$ may include coordinates indicating the estimated position of the head relative to the device. The coordinates may be XYZ coordinates or some other coordinates. When the composite head position is determined, each position value may be adjusted by the reliability score. For example, if a reliability score R goes from 0 to 1, with 0 indicating full motion sensor trust and 1 indicating full head tracking system trust, then a composition position $P_{COMP}$ may be determined using the following equation: $P_{COMP}=(P_{HT}(R)+P_{MS}(1-R))/2$. Thus, the composite position is a weighted average of the head tracking estimated position and the motion sensor estimated position. The reliability score weights each of $P_{HT}$ and $P_{MS}$ based on how reliable they are. Thus the composite position used to render the UI considers each estimated position based on its reliability. The composite position may also be used as the referenced previous position the next time the motion sensor (s) recomputed estimated position based on device movement.

The device may use the composite position to render the UI, and then display the UI on a display of the device. The display of the UI may be such that it appears configured for viewing from the composite position. For example, effects such as parallax, simulated three-dimensional depth, etc. may be rendered and displayed as if viewed from the composite position. The device may also render a new instantiation of the UI based on detecting a gesture command, such as a tilt gesture, swivel gesture, motion in front of a device, a swipe, double-tap, etc. For example, a tilt gesture may call for a menu user interface element to appear. In that case the device may detect the tilt gesture and render a new instantiation of the UI with the menu user interface element. The new instantiation of the UI may also be based on the composite position. The new instantiation of the UI may then be displayed on the display of the device. The new instantiation of the UI may also be based on a scene change, that is the output of the cameras indicates numerous changes detected by the camera, the device may render (and display) a new instantiation of the UI.

In certain situations, an adjustment may be made based on the relative age of the data used by the head tracking system and/or motion sensor(s). For example, the device may account for the respective latencies of the various data in an attempt to create a composite position that is based on data taken at the same time. Specifically, only data from the motion sensor(s) that is within the latency period of the head tracking system may be used, so that no motion sensor(s) data is used that has no corresponding head tracking data. In another example, only data from a certain time window (for example, the most recent 10-50 ms) may be used.

To improve system performance, a feedback-type embodiment may be implemented where certain types of movement as captured by the motion sensor(s) may be fed back into the head tracking system to assist the head tracking system in identifying the user's head. For example, in the face of rapid device movement, the motion sensor(s) would quickly identify the movement and let the head tracking system know. The cameras used by the head tracking system may only see a movement blur, but may focus on an area the head might be as determined based on the feedback from the motion sensors. Such an embodiment may assist the head tracking system to more quickly identify the head under certain conditions.

Figure 11:
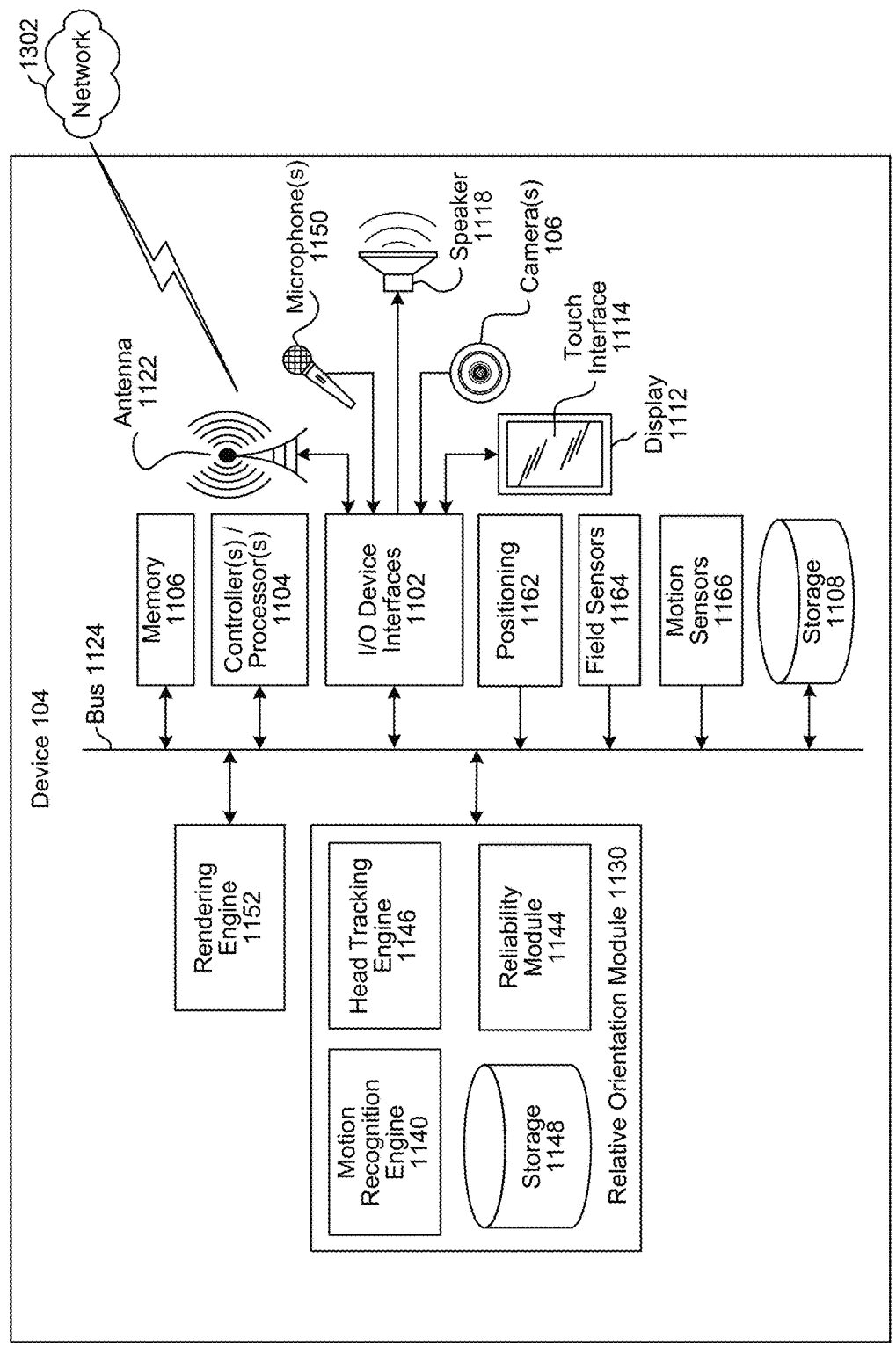
FIG. 11 is an example block diagram conceptually illustrating example components of a device in accordance with various embodiments.

FIG. 11 illustrates a block diagram conceptually illustrating components of a system 100 to operate the movement threshold based user interface described herein. Depending upon how the system is structured, some of components shown in FIG. 11 as part of a device 104 may be included in a remote server. In operation, the system 100 may include computer-readable and computer-executable instructions that reside in storage 1108 on the device 104. The device 104 may be a mobile device, such as a smart phone, tablet, smart watch, or the like.

The device 104 may include one or more controllers/processors 1104 comprising one-or-more central processing units (CPUs) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The device 104 may also include a data storage component 1108 for storing data and processor-executable instructions. The data storage component 1108 may include one or more non-volatile storage types such as magnetic storage, optical storage, solid-state storage, etc. The device 104 may also be connected to a removable or external non-volatile memory and/or storage (such as a removable memory card, memory key drive, networked storage, etc.) through the input/output device interfaces 1102.

Executable instructions for operating the device 104 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

As shown in FIG. 11, the device 104 may include one or more of a variety of sensors. Among the sensors are an audio capture component such as microphone(s) 1150, an image and/or video capture component such as camera(s) 106, a touch interface 1114, an antenna 1122, positioning sensors 1162, field sensors 1164 (e.g., a 3-axis magnetometer, a gravity sensor), and motion sensors 1166 (e.g., a 3-axis accelerometer, a 3-axis gyroscope). The device 104 may also include one or more buttons (not shown). Several of each of these components may be included. Also, although shown as integrated within device 104, some or parts of the various sensors may be external to device 104 (such as AR glasses 104b, wireless headset 1321, etc.) and accessed through input/output device interfaces 1102 either wirelessly or through a physical connection. The sensors may produce output data that may be used in determining movement signatures, as explained below.

The field sensors 1164, motion sensors 1166, or other sensors may include synthetic/virtual sensors that may output accurate three-dimensional position/motion information. The sensors may thus provide multiple degrees of freedom (such as 6DOF described above) plus a position of the user's head in space resulting in potentially nine degrees of freedom (9DOF) (the head position resulting in another three degrees of freedom in XYZ space). The camera(s) 106 may include any image and/or video capture component such as a structured light sensor, time of flight sensor, millimeter wave detector, or suitable component.

The antenna 1122 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 1150 or array of microphones, a wired headset (not illustrated), a wireless headset (e.g., wireless headset 1321 in FIG. 8), etc. If an array of microphones is included, approximate distance to a sound's point of origin may be performed acoustic localization based on time and amplitude differences between sounds captured by different microphones of the array.

The touch interface 1114 may be integrated with a surface of a display 1112 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The positioning module 1162 provides an interface for acquiring location information, such as information from satellite geographic positioning system(s). For example, the positioning module 1162 may include a Global Positioning System (GPS) receiver and/or a Global Navigation Satellite System (GLONASS) receiver. The positioning module 1162 may also acquire location-based information using other radio sources (e.g., via antenna 1122), such as mapping services that triangulate off of known WiFi service set identifiers (SSIDs) or cellular towers within range of the device 104.

The field sensor module 1164 provides directional data. The field sensor module 1164 may include a 3-axis magnetometer that measures magnetic fields and may serve as a compass. The field sensor module 1164 may also include a dedicated gravity sensor to determine up-and-down.

The motion sensor module 1166 provides inertial data, and may include 3-axis accelerometer and a 3-axis gyroscope.

Examples of other sensors include an electronic thermometer to measure ambient temperature and a proximity sensor to detect whether there is an object within a certain distance of the device 104.

Sensors may be communicatively coupled with other components of system 100 via input/output (I/O) device interfaces 1102 and/or via an address/data bus 1124. The address/data bus 1124 conveys data among components of the device 104. Each component within the device 104 may also be directly connected to other components in addition to (or instead of) being connected to other components across the bus 1124.

The I/O device interfaces 1102 may connect to a variety of components and networks. Among other things, the I/O device interfaces 1102 may include an interface for an external peripheral device connection such as universal serial bus (USB), FireWire, Thunderbolt or other connection protocol. The input/output device interfaces 1102 may also support a variety of networks via an Ethernet port and antenna 1122.

The system 100 may also include a video output component for displaying images, such as display 1112. The video output component may be a display of any suitable technology, such as a liquid crystal display, an organic light emitting diode display, electronic paper, an electrochromic display, a pico projector, etc. The video output component may be integrated into the device 104 or may be separate.

The system 100 may also include an audio output component such as a speaker 1118, a wired headset (not illustrated), or a wireless headset (e.g., wireless headset 1321). Other output devices include a haptic effect generator (not illustrated). The haptic effect generator may be of any haptic technology, including technologies to vibrate the entire device 104 (e.g., electromagnetic technologies such as vibratory motor or a coil with a central mass) and/or may comprise technologies allowing the haptic effect to be localized to a position of the touch interface 1114, such as electroactive polymers, piezoelectrics, electrostatics, subsonic audio wave surface actuation, etc.

As discussed above, device 104 includes controller(s)/processors 1104, memory 1106, and storage 1108. In addition, the device 104 may include a relative orientation module 1130 and a rendering engine 1152, each of which may comprise processor-executable instructions stored in storage 1108 to be executed by controller(s)/processor(s) 1104 (e.g., software, firmware), hardware, or some combination thereof. For example, components of the relative orientation module 1130 or rendering engine 1152 may be part of a software application running in the foreground and/or background on the device 104. The rendering engine 1152 actually renders, as in generates the appearance of, a graphical user interface.

The relative orientation module 1130 is used to determine the orientation of the device relative to an object (such as the user's head or other object). The relative orientation module 1130 includes a head tracking engine 1146, which utilizes the camera(s) 106 (or other components) to estimate a head of a user relative to the device 104 as discussed above. For example, the head tracking engine 1146 may detect a position (including distance, angle, etc.) of a user's face or head relative to the device 104 and pass that information to the rendering engine 1152 which will then render the user interface in a manner that positions the user interface based on the user's position relative to the device. The relative orientation module 1130 also includes a motion recognition engine 1140 that may recognize motion of the device 104 as indicated by data obtained from the positioning components 1162, field sensors 1164, motion sensors 1166, or other components and may estimate a user's head position based on that data. The relative orientation module 1130 also includes a reliability module 1144 that may determine a reliability of data or estimated positions obtained from the motion recognition engine 1140 and/or head tracking engine 1145. The relative orientation module 1130 may also include storage 1148 that stores data used by the motion recognition engine 1140, head tracking engine 1146, and/or reliability module 1144.

While described above in terms of determining the location of a user's head, the head tracking engine 1146, camera(s) 106, and related components may also be used to locate and track other objects, for example another body part of the user (hands, feet, etc.), or other objects, such as a wearable device on the user, other object being held by the user, or other object detectable by the device (chair, desk, etc.). The techniques described above in relation to tracking a head may also be used to track such other objects.

Data from the relative orientation module 1130 (including weighted estimated head positions and/or composite estimated head positions, etc.) may be sent from the relative orientation module 1130 to the rendering engine 1152. The rendering engine 1152 may then use that data to render the UI. The rendering engine 1152 may re-render the appearance of a UI according to a configured refresh rate. The refresh rate may be set to re-render the UI many times per second (for example, 60 times per second) so that UI re-rendering is seamless from the user's perspective. The appearance of UI features may change quickly depending on the speed of movement of the user relative to the device. Further, if the user or device is moved unexpectedly, certain UI features may be re-rendered in a way that is undesirable to a viewing user.

Figure 12:
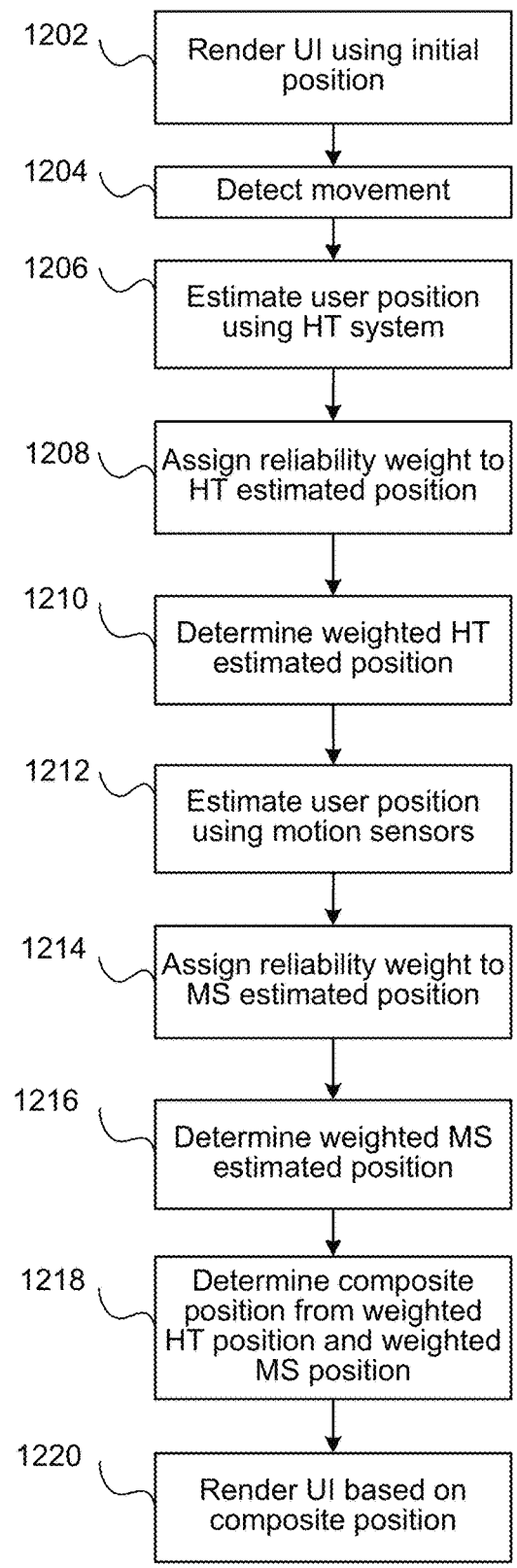
FIG. 12 is an example of a method for implementing an algorithm for determining an estimated user position from multiple data sources in accordance with various embodiments.

FIG. 12 illustrates an example algorithm for trust allocation when rendering a user interface (UI) that depends on user position according to one aspect of the present disclosure. The algorithm is an illustration, and other algorithms using different, reordered, and/or removed steps may also be used. A device may render a UI using an initial position (1202). The device may then detect device or head movement (1204). In response to the movement, the device may estimate a user position relative to the device using a head tracking (HT) system (1206). The device may then assign a reliability weight to the head tracking system's estimated position (1208). The device may then determine a weighted estimated position for the head tracking system (1210) by multiplying the weight determined in step 1208 by the estimated position determined in step 1206. In response to the movement, the device may also estimate a user position relative to the device using one or more motion sensors (1212). The device may then assign a reliability weight to the motion sensor(s)' estimated position (1214). The device may then determine a weighted motion sensor (MS) estimated position (1216) by multiplying the weight determined in step 1214 by the estimated position determined in step 1212. The device may determine a composite estimated position (1218) by taking the average of the weighted HT position from step 1210 and the weighted MS estimated position from step 1216. The device may then render the UI based on the composite estimated position (1220).

Figure 13:
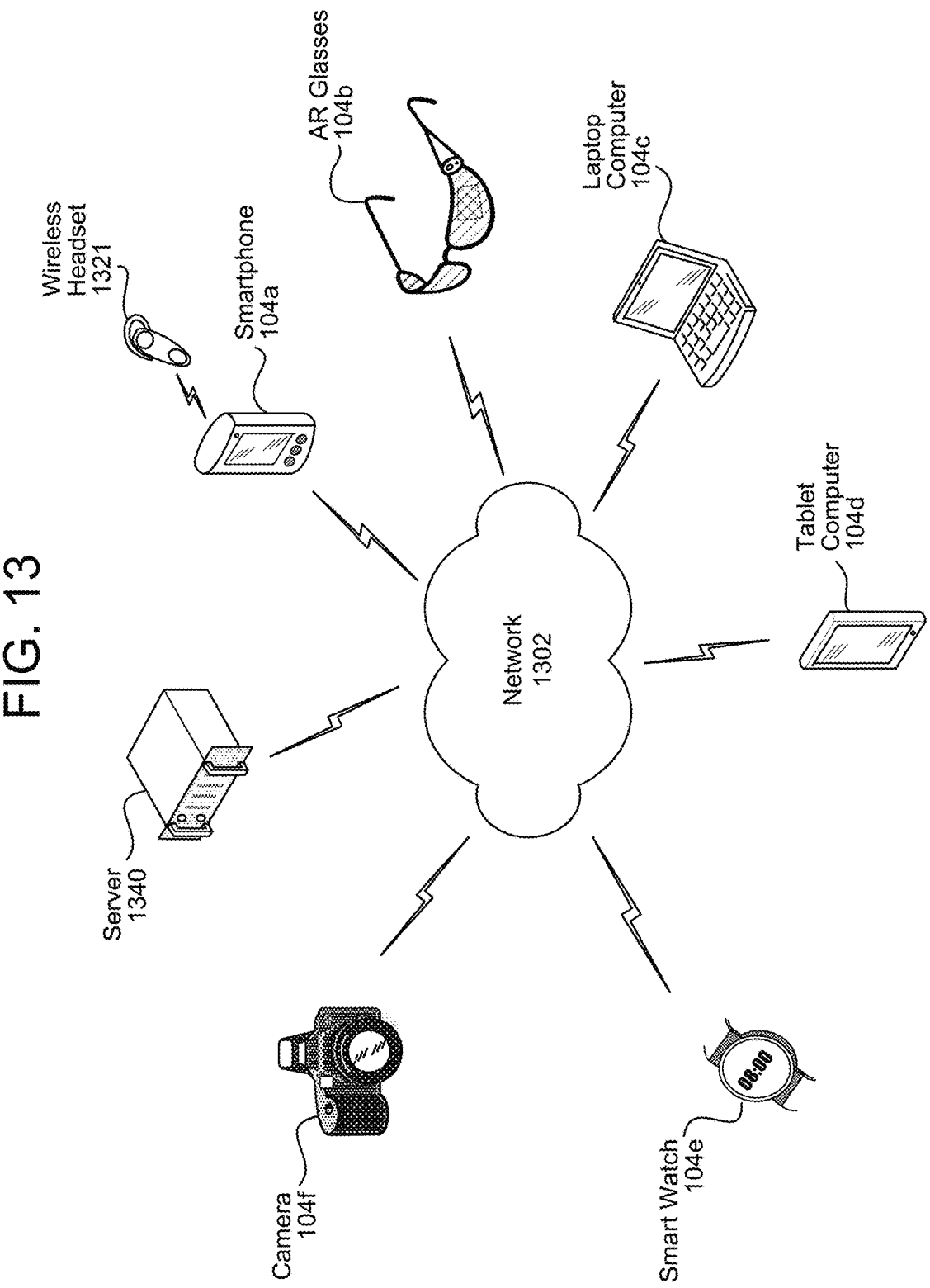
FIG. 13 illustrates an example of a computer network system.

Referring to FIG. 13, different mobile devices 104*a* to 104*e* may contain different components of the system 100 and the devices may be connected over a network 1302 to one or more servers 1340. For example, the augmented reality (AR) glasses 104*b* and smart watch 104*e* may include the head tracking engine 1146 and/or motion recognition engine 1140, the server 1340 may include the reliability module 1144, but actual rendering of the UI may be done on tablet 104*d* using the tablet's rendering engine 1152. In one aspect, user position/movement detected by one device (such as smart watch 104*e*) may be used to configure a UI on a different device.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for rendering a position-dependent user interface, the method comprising:
   rendering a first instantiation of a user interface (UI) by a device, the rendering based on an initial estimated position of a user's head;
   detecting a movement of the device using at least one of camera output from a plurality of cameras included in the device or motion sensor output from at least one motion sensor included in the device, the at least one motion sensor being at least one of a gyroscope or an accelerometer;
   in response to detecting the movement, determining a first estimated head position based on the camera output, the first estimated head position comprising coordinates;
   determining a first reliability score for the first estimated head position, the first reliability score being based on the camera output;
   in response to detecting the movement, determining a second estimated head position based on the motion sensor output and the initial estimated position;
   determining a second reliability score for the second estimated head position, the second reliability score being based on the motion sensor output;
   multiplying the first reliability score by the first estimated head position to determine a first weighted estimated head position;
   multiplying the second reliability score by the second estimated head position to determine a second weighted estimated head position;
   determining a composite estimated head position by taking an average of the first weighted estimated head position and the second weighted estimated head position; and
   rendering a second instantiation of the UI based on the composite estimated head position.

2. The computer-implemented method of claim 1, further comprising at least one of decreasing the first reliability score based on an increase in a time since receipt of the camera output or increasing the second reliability score based at least in part on a speed or acceleration of the detected movement.

3. The computer-implemented method of claim 1, further comprising displaying the second instantiation of the UI on a display of the device, such that the display appears configured for viewing from the composite estimated head position.

4. A computing system, comprising:
   a display;
   at least one camera;
   at least one motion sensor;
   at least one memory; and
   at least one processor coupled to the at least one memory, the at least one processor being configured to:
      determine a first estimated position of at least a portion of a user using camera output from the at least one camera;
      determine a second estimated position of the portion of the user using sensor output from the at least one motion sensor;
      determine a first reliability score of the camera output, the first reliability score based on the camera output;
      determine a second reliability score of the sensor output, the second reliability score based on the sensor output;
      determine a third estimated position of a user based at least in part on the first estimated position weighted by the first reliability score, and the second estimated position weighted by the second reliability score; and
      render a user interface for presentation on the display based on the third estimated position.

5. The computing system of claim 3, wherein the third estimated position is determined in response to a movement indicated by at least one of the camera output or sensor output.

6. The computing system of claim 5, wherein the at least one processor is further configured to determine at least one of the first reliability score or the second reliability score based at least in part on a speed or acceleration of the movement.

7. The computing system of claim 6, wherein the at least one processor is further configured to increase the second reliability score based on an increase of the speed, the increase of the speed determined based at least in part on at least one of the sensor output or camera output.

8. The computing system of claim 3, wherein the at least one processor is further configured to determine at least one of the first reliability score or second reliability score is based at least in part on a distance between the first estimated position and the second estimated position.

9. The computing system of claim 8, wherein the at least one processor is further configured to increase the first reliability score based on an increase in the distance, the increase in the distance determined based at least in part on at least one of the sensor output or camera output.

10. The computing system of claim 3, wherein the at least one processor is further configured to decrease the first reliability score based on an increase in a time since determination of the camera output.

11. The computing system of claim 3, wherein the at least one motion sensor is at least one of a gyroscope, accelerometer, or magnetometer.

12. A method comprising:
   determining a first estimated position of at least a portion of a user using camera output from the at least one camera;
   determining a second estimated position of the portion of the user using sensor output from the at least one motion sensor;
   determining a first reliability score of the camera output, the first reliability score based on the camera output;
   determining a second reliability score of the sensor output, the second reliability score based on the sensor output;
   determining a third estimated position of a user based at least in part on the first estimated position weighted by the first reliability score, and the second estimated position weighted by the second reliability score; and
   rendering a user interface for presentation on the display based on the third estimated position.

13. The method of claim 12, wherein the third estimated position is determined in response to a movement indicated by at least one of the camera output or sensor output.

14. The method of claim 13, further comprising determining at least one of the first reliability score or the second reliability score based at least in part on a speed or acceleration of the movement.

15. The method of claim 14, further comprising increasing the second reliability score based on an increase of the speed, the increase of the speed determined based at least in part on at least one of the sensor output or camera output.

16. The method of claim 12, further comprising determining at least one of the first reliability score or second reliability score based at least in part on a distance between the first estimated position and the second estimated position.

17. The method of claim 16, further comprising increasing the first reliability score based on an increase in the distance, the increase in the distance determined based at least in part on at least one of the sensor output or camera output.

18. The method of claim 12, further comprising decreasing the first reliability score based on an increase in a time since determination of the camera output.

19. The method of claim 12, wherein the at least one motion sensor is at least one of a gyroscope, accelerometer, or magnetometer.

* * * * *